(12) United States Patent  
Ohki

(10) Patent No.: US 12,483,331 B2
(45) Date of Patent: Nov. 25, 2025

(54) OPTICAL TRANSCEIVER

(71) Applicant: YOKOWO CO., LTD., Tokyo (JP)

(72) Inventor: Akira Ohki, Tokyo (JP)

(73) Assignee: YOKOWO CO., LTD., Tokyo (JP)

( * ) Notice: Subject to any disclaimer, the term of this patent is extended or adjusted under 35 U.S.C. 154(b) by 248 days.

(21) Appl. No.: 18/287,467

(22) PCT Filed: Mar. 30, 2022

(86) PCT No.: PCT/JP2022/016127
§ 371 (c)(1),
(2) Date: Oct. 19, 2023

(87) PCT Pub. No.: WO2022/224777
PCT Pub. Date: Oct. 27, 2022

(65) Prior Publication Data
US 2024/0388365 A1 Nov. 21, 2024

(30) Foreign Application Priority Data

Apr. 21, 2021 (JP) ................................. 2021-071723

(51) Int. Cl.
*H04B 10/40* (2013.01)
*H01S 5/02212* (2021.01)
(Continued)

(52) U.S. Cl.
CPC ......... *H04B 10/40* (2013.01); *H01S 5/02212* (2013.01); *H01S 5/02251* (2021.01); *H01S 5/042* (2013.01); *H01S 5/183* (2013.01)

(58) Field of Classification Search
CPC . H04B 10/40; H01S 5/02251; H01S 5/02212; H01S 5/042; H01S 5/183
(Continued)

(56) References Cited

U.S. PATENT DOCUMENTS

| 11,719,898 B2* | 8/2023 | Nagarajan | ............ G02B 6/4257 |
| | | | 398/164 |
| 2005/0025438 A1* | 2/2005 | Go | ....................... G02B 6/4201 |
| | | | 385/92 |

(Continued)

FOREIGN PATENT DOCUMENTS

| CN | 107608039 A | 1/2018 |
| JP | 2002-365489 A | 12/2002 |

(Continued)

*Primary Examiner* — Dalzid E Singh
(74) *Attorney, Agent, or Firm* — XSENSUS LLP

(57) ABSTRACT

An optical transceiver includes a first optical module and a second optical module. A first holding unit and a second holding unit are provided in a main housing. The second holding unit holds the second optical module so that a module body of the second optical module is positioned closer to a first side than a module body of the first optical module. Further, the second holding unit holds the second optical module in a positional relationship such that, in a projection of the optical modules on a virtual plane orthogonal to a direction normal to metal substrates thereof, an outer periphery of the module body of the second optical module is in a region positioned between an outer periphery of the module body of the first optical module and an outer periphery of a light input and output unit of the first optical module.

16 Claims, 18 Drawing Sheets

(51) Int. Cl.
*H01S 5/02251* (2021.01)
*H01S 5/042* (2006.01)
*H01S 5/183* (2006.01)

(58) Field of Classification Search
USPC .......................................................... 398/135
See application file for complete search history.

(56) References Cited

U.S. PATENT DOCUMENTS

| | | |
|---|---|---|
| 2005/0147419 A1* | 7/2005 | Verdiell ................ H01S 5/4087 398/214 |
| 2010/0008630 A1 | 1/2010 | Marrapode et al. |
| 2013/0230278 A1 | 9/2013 | Hung et al. |
| 2017/0248763 A1 | 8/2017 | Kawamura et al. |
| 2019/0069395 A1 | 2/2019 | Noguchi et al. |
| 2020/0195350 A1 | 6/2020 | Matsui et al. |
| 2020/0295836 A1* | 9/2020 | Ishii .................... H04J 14/0305 |
| 2022/0115832 A1* | 4/2022 | Lin ..................... H01S 5/06825 |

FOREIGN PATENT DOCUMENTS

| | | |
|---|---|---|
| JP | 2005-033019 A | 2/2005 |
| JP | 2009-514038 A | 4/2009 |
| JP | 2013-182276 A | 9/2013 |
| JP | 2016-057567 A | 4/2016 |
| JP | 2017-156448 A | 9/2017 |
| JP | 2019-046922 A | 3/2019 |
| JP | 2020-098249 A | 6/2020 |
| JP | 2020-148828 A | 9/2020 |

\* cited by examiner

OPTICAL TRANSCEIVER

CROSS-REFERENCE TO RELATED APPLICATIONS

The present application is based on PCT filing PCT/JP2022/016127, filed Mar. 30, 2022, which claims priority from Japanese Patent Application No. 2021-071723, filed Apr. 21, 2021, the entire contents of each are incorporated herein by reference.

TECHNICAL FIELD

The present invention relates to an optical transceiver used for construction of an optical communication network, and more particularly to an optical transceiver structure suitable for achieving miniaturization and large capacity.

BACKGROUND ART

For example, Patent Literature 1 discloses an optical transceiver in which each of an optical signal transmission module (optical transmission module) and an optical signal reception module (optical reception module) in the related art is incorporated. The optical transceiver disclosed in Patent Literature 1 is a so-called small form-factor pluggable (SFP) transceiver, and is widely used for electric communication and data transfer as a compact optical transceiver capable of hot-swapping.

As a two-core optical connector of the SFP transceiver, an LC-type optical connector in which an inter-core pitch of an optical fiber is set to, for example, 6.25 mm is generally used. The optical transmission module and the optical reception module incorporated in the LC-type optical connector have a maximum width (for example, 6 mm or less) smaller than the inter-core pitch. Generally, these modules are mounted on and fixed to the housing in a parallel arrangement. Hereinafter, in this specification, the term "optical transceiver module" may be used as a general term for the concept of the optical transmission module and the optical reception module, but this does not mean a narrowly defined "optical transceiver module" commonly used for optical transmission and optical reception.

Here, the optical transceiver module for the SFP transceiver with a large communication capacity needs to incorporate a transmission circuit or a reception amplifier that consumes a large amount of power. An optical transceiver module implemented as a TO-CAN type package (metal can package) having a substrate for mounting an element that also serves as a metal heat sink and having a metal sealing structure with excellent dust resistance and impact resistance is preferably used. The TO-CAN type package has various sizes such as TO-9 ($\varphi$=9 mm), TO-56 ($\varphi$=5.6 mm), TO-38 ($\varphi$=3.8 mm) according to an outer diameter $\varphi$ of a metal cover for sealing. For example, a TO-56-type optical transceiver module is widely used for the SFP transceiver.

In recent years, optical communication demands have been increasing, and the communication capacity required for one optical transceiver also increased to 40 to 200 Gbps. In response to this, a quad small form-factor pluggable (QSFP) transceiver, which has fourth channels each of a transmission unit and a reception unit, has been developed. Since an infrastructure of an optical fiber with the LC-type optical connector is widely used in the SFP transceiver, there is a trend to adopt an LC-type optical connector using a TO-CAN type package similar to that in the SFP transceiver in the QSFP transceiver for the purpose of inheriting the infrastructure.

CITATION LIST

Patent Literature

Patent Literature 1: JP2013-182276A
Patent Literature 2: JP2017-156448A
Patent Literature 3: JP2020-98249A

SUMMARY OF INVENTION

Technical Problem

An optical transmission module for the QSFP requires four types of optical transmission elements with different wavelengths and a multiplexing filter for wavelength multiplexing. Similarly, an optical reception module for the QSFP requires a filter that demultiplexes the four multiplexed wavelengths and four optical reception elements. In any case, it is necessary to prepare a dedicated module in which more components are integrated into the package than that in the SFP transceiver, and there is a high technical hurdle in size reduction for incorporation into the LC-type optical connector, which has size restrictions according to a standard.

Therefore, there is also a method of using a multiple fiber push on type (an MPO-type) optical connector in which a plurality of optical fibers such as eight optical fibers are linearly aligned, as described in Patent Literatures 2 (FIGS. 2, 3, 4) and 3 (FIGS. 3A to 8), instead of the LC-type optical connector. In the MPO-type optical connector, a VCSEL array in which a plurality of vertical cavity surface emitting lasers (VCSEL) are integrated on a light transmission side is used, a PD array in which a plurality of photo diodes (PD) are integrated on a light reception side is used, and a wavelength multiplexing method is not adopted, according to the required number of channels. Therefore, there is an advantage that a filter for multiplexing or demultiplexing unlike the case of using the LC-type optical connector is not required. However, a complicated optical system (for example, a reflecting mirror that bends an optical path at a right angle) is required for directly optically coupling an optical semiconductor element array to a large number of optical fiber arrays. Therefore, it is practically impossible to compactly and hermetically seal an optical semiconductor element and a peripheral driving circuit together with the optical system, as in the case of the optical transceiver module implemented as the TO-CAN type package. As a result, there is a drawback that the reliability is likely to be impaired, such as malfunction and shortened life due to a disturbance derived from a usage environment such as dust and humidity.

As a problem common to any of the above configurations, since an optical transmission and reception system of a plurality of channels is integrated into one module, there is a problem that a manufacturing yield decreases in proportion to the number of channels when viewed as a whole of the optical transceiver, and a failure probability also increases. That is, even if the performance of only one of a plurality of transmission and reception channels incorporated in the optical transceiver is poor or only one of the plurality of transmission and reception channels fails, the optical transceiver as a whole becomes unusable. Unless the entire optical transmission module or the reception module corresponding to the plurality of channels is replaced, the optical transmission module or the reception module cannot be recovered, and an increase in cost is unavoidable in both cases of manufacturing and maintenance.

An object of the present invention is to provide an optical transceiver that is excellent in reliability and that is capable of more compactly incorporating a plurality of optical modules into a main housing while taking over a configuration of a metal-sealed optical module used for an LC-type connector or the like, and further capable of easily achieving multi-channel transmission and reception with a simple configuration.

Solution to Problem

In order to solve the above problems, an optical transceiver according to the present invention includes: two or more optical modules each including a module body and an optical input and output unit; and a main housing. The module body includes a metal substrate, an optical semiconductor element and a drive circuit unit of the optical semiconductor element that are mounted on a first main surface of the metal substrate, a high-frequency terminal that has one end electrically connected to the drive circuit unit and the other end side penetrating the metal substrate and extending from a second main surface of the metal substrate and that constitutes an electrical input and output unit of the drive circuit unit, a metal cover joined to the first main surface of the metal substrate while covering the drive circuit unit, and a light-passing unit that is provided on an end surface of the metal cover on a side opposite to a coupling side to the metal substrate and that forms an optical input and output unit of the optical semiconductor element. The optical input and output unit has one end optically coupled to the light-passing unit and the other end side extending in a direction away from the light-passing unit, and has a diameter smaller than a diameter of the metal cover. A plurality of the optical modules are assembled to the main housing such that normal directions of the main surfaces of the metal substrate are parallel to each other, and the main housing includes an optical connection opening which is a connection side to the optical input and output unit and is formed on an end portion on a first side in the normal direction, and a high-frequency connection opening which is a connection side to the high-frequency terminal and is formed separately from the optical connection opening. One of a pair of predetermined optical modules disposed adjacent to each other among the plurality of optical modules is a first optical module, and the other is a second optical module. In the main housing, a first holding unit that holds the first optical module and a second holding unit that holds the second optical module such that a module body of the second optical module is located on the first side of a module body of the first optical module and that holds the second optical module in a positional relation in which an outer peripheral edge of the module body of the second optical module enters a region located between an outer peripheral edge of the module body of the first optical module and an outer peripheral edge of the optical input and output unit of the first optical module in projection onto a virtual plane orthogonal to the normal direction are formed.

An optical transmission module and an optical reception module can be assembled to the main housing as optical modules in a mixed manner. Alternatively, a plurality of optical transmission modules and a plurality of optical reception modules can be assembled to the main housing in a mixed manner.

A plurality of pairs of the first optical module and the second optical module that satisfy a configuration of the present invention may be assembled to one main housing. In this case, one of a pair of the first optical module and the second optical module may be used as another pair of the first optical module or the second optical module.

Advantageous Effects of Invention

In an optical transceiver according to the present invention, an optical module having a metal-sealed structure in which an optical semiconductor element and a drive circuit unit of the optical semiconductor element are mounted on a first main surface of a metal substrate and a first main surface side is sealed by a metal cover is used, and thus dust resistance and impact resistance to the optical semiconductor element and the drive circuit unit are improved. A plurality of such optical modules are assembled to a main housing. One of a pair of predetermined optical modules is a first optical module, and the other is a second optical module. In the main housing, a first holding unit that holds a first optical module and a second holding unit that holds a second optical module such that a module body of the second optical module is located on a first side of a module body of the first optical module and that holds the second optical module in a positional relation in which an outer peripheral edge of the module body of the second optical module enters a region located between an outer peripheral edge of the module body of the first optical module and an outer peripheral edge of an optical input and output unit of the first optical module in projection onto a virtual plane orthogonal to a normal direction are provided. As a result, in the pair, an inter-terminal distance of the optical input and output units of the first optical module and the second optical module can be further reduced. That is, it is possible to more compactly incorporate the plurality of optical modules into the main housing while inheriting a configuration of a metal-sealed optical module used in an LC-type connector or the like.

In particular, when a configuration is adopted in which a plurality of optical transmission modules and a plurality of optical reception modules are assembled to the main housing in a mixed manner, it is possible to easily achieve multi-channel transmission and reception with a simple configuration, and it is possible to achieve both compactness and improvement in reliability.

DESCRIPTION OF EMBODIMENTS

Hereinafter, embodiments of the present invention will be described in detail.

Embodiment 1

Figure 1A:
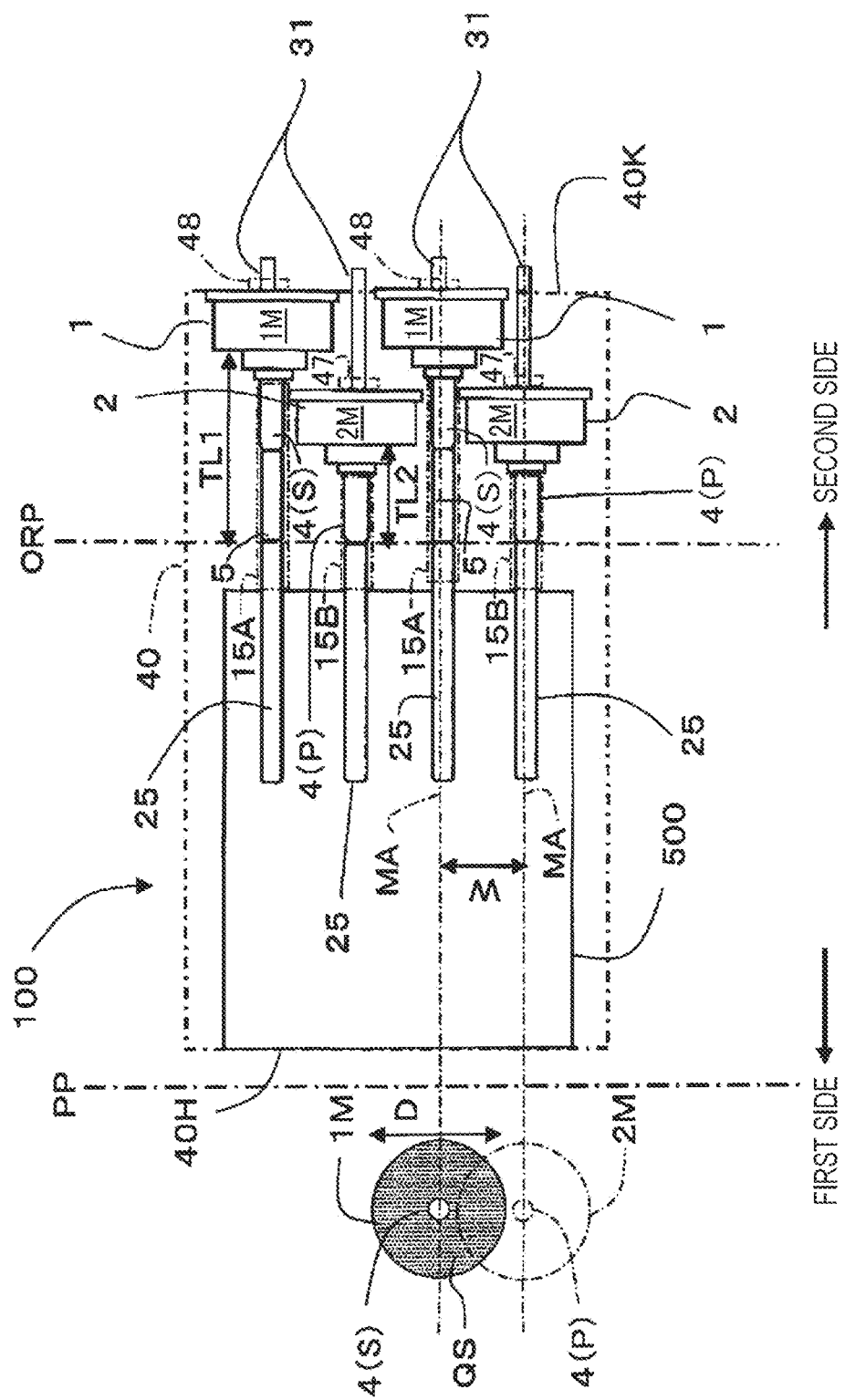
FIG. 1A is a diagram schematically illustrating a configuration of an optical transceiver according to Embodiment 1 of the present invention.
Figure 1B:
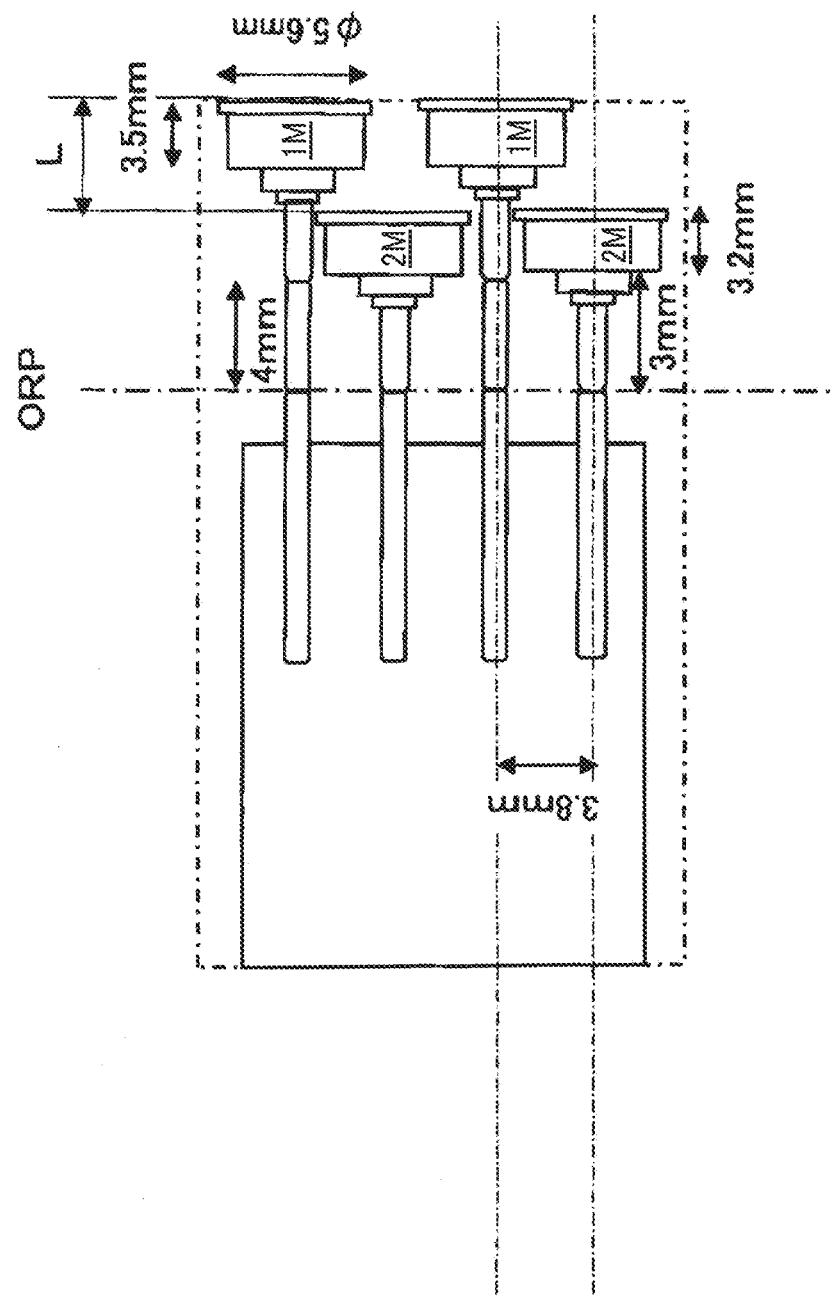
FIG. 1B is a view illustrating an example of a dimensional relation of main parts of the optical transceiver in FIG. 1A.

FIG. 1A is a schematic diagram conceptually illustrating an embodiment of an optical transceiver according to the present invention, and FIG. 1B is a schematic diagram illustrating a dimensional setting example of main parts of the optical transceiver. An optical transceiver 100 includes a plurality of optical modules 1 and 2 and a main housing 40 to which the optical modules 1 and 2 are assembled. In the present embodiment, the optical module 1 is implemented as an optical transmission module, and the optical module 2 is implemented as an optical reception module.

Figure 2:
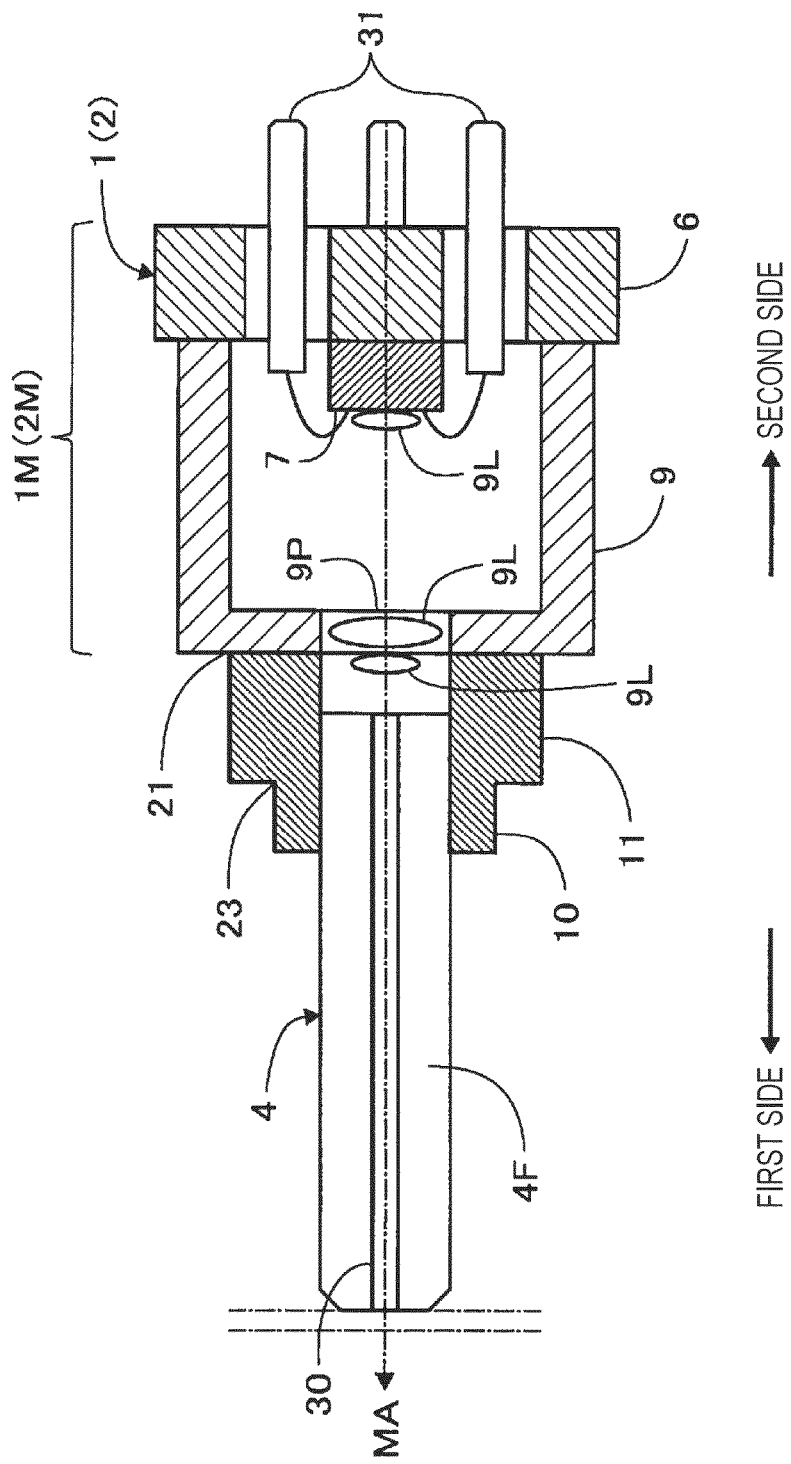
FIG. 2 is an enlarged sectional view of an optical transceiver module used in the optical transceiver in FIG. 1A.
Figure 3A:
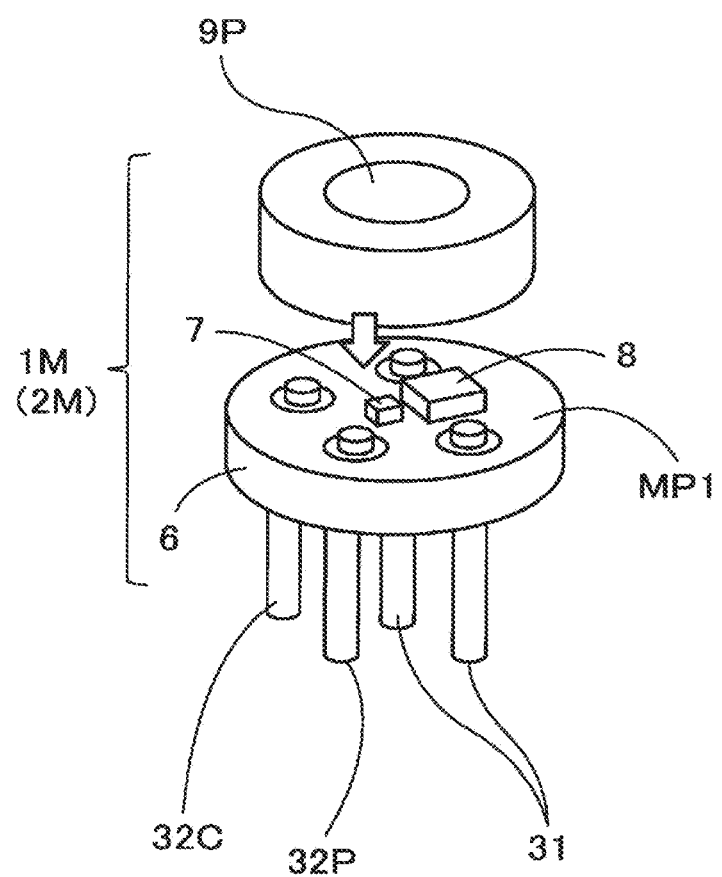
FIG. 3A is a diagram illustrating an internal structure of the optical transceiver module in FIG. 2.
Figure 3B:
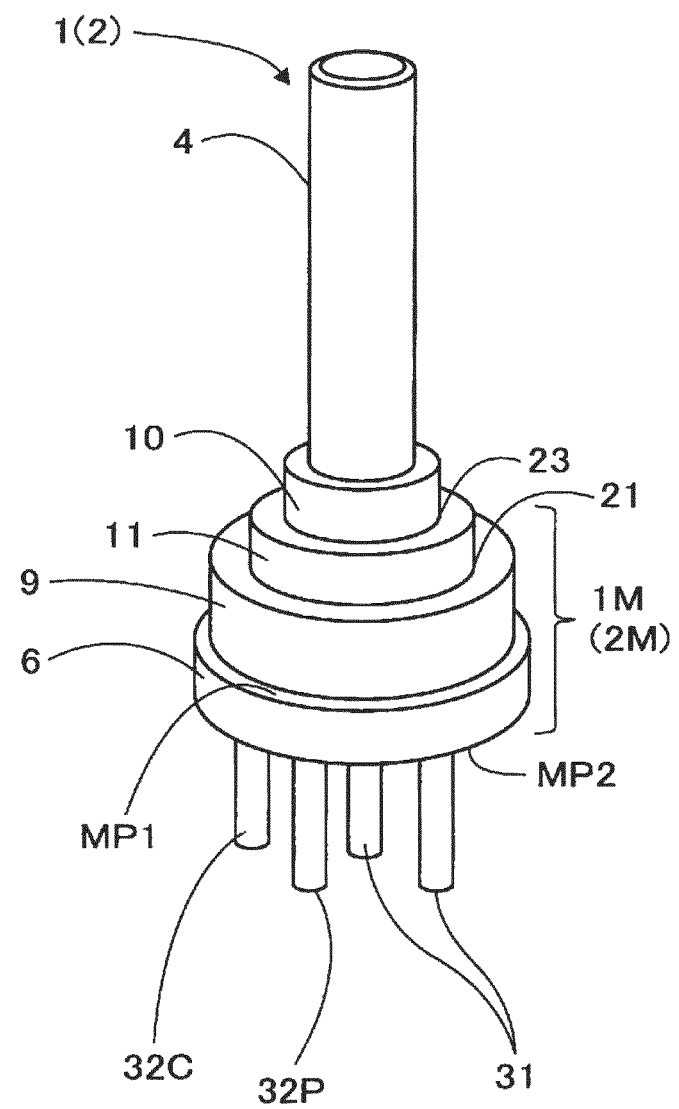
FIG. 3B is a view illustrating an appearance of the optical transceiver module in FIG. 3A in a state where assembly is completed.

FIG. 2 is enlarged sectional views of the optical modules 1 and 2, and FIGS. 3A and 3B are diagrams illustrating internal structures and assembly forms of the optical modules 1 and 2. When the optical modules 1 and 2 are collectively referred to, the optical modules 1 and 2 are referred to as optical modules 1 and 2 or optical module 1 (2). As illustrated in FIG. 3A, the optical module 1 (2) includes an optical input and output unit 4 and a module body 1M (2M) including a metal substrate 6, an optical semiconductor element 7, a drive circuit unit 8 that drives the optical semiconductor element 7, high-frequency terminals 31, a metal cover 9, and a light-passing unit 9P. The light-passing unit 9P is made of a transparent material such as glass. An optical system including the light-passing unit 9P includes a lens. For example, as indicated by broken lines in FIG. 2, the lens may also serve as the light-passing unit 9P (in this case, the light-passing unit 9P is replaced with a glass lens 9L). However, the lens may be provided as a separate lens 9L provided at a position different from that of the light-passing unit 9P in an optical axis direction, as indicated by one-dot chain lines in the drawing. In this case, the light-passing unit 9P can be implemented as a flat glass window.

The optical semiconductor element 7 and the drive circuit unit 8 are mounted on a first main surface MP1 of the metal substrate 6. A plurality of high-frequency terminals 31 are provided. One end of each of the high-frequency terminals 31 is electrically connected to the drive circuit unit 8, the other end side thereof penetrates the metal substrate 6 and extends from a second main surface MP2 of the metal substrate 6, and the high-frequency terminals 31 constitute an electrical input and output unit of the drive circuit unit 8. The second main surface MP2 faces an opposite side to the first main surface MP1. The metal cover 9 is formed in a tubular shape that is joined to the first main surface MP1 of the metal substrate 6 while covering the optical semiconductor element 7 and the drive circuit unit 8 in a sealed manner. The light-passing unit 9P is provided on an end surface of the metal cover 9 on a side opposite to a coupling side to the metal substrate 6, and transmits light input and output to and from the optical semiconductor element 7. The optical input and output unit 4 has a diameter smaller than a diameter of the metal cover 9, and has one end optically coupled to the light-passing unit 9P and the other end side extending in a direction away from the light-passing unit 9P.

As illustrated in FIG. 3A, the metal substrate 6 constitutes a TO header portion together with the high-frequency terminal 31, and is formed in a circular plate shape having a diameter of, for example, about 5.6 mm and a thickness of about 1 mm. When the optical module is an optical transmission module, the optical semiconductor element 7 is, for example, a vertical cavity surface emitting laser element (VCSEL element), and the drive circuit unit 8 is implemented by a driver IC of the VCSEL element. When the optical module is an optical reception module, the optical semiconductor element 7 is, for example, a photo diode, and the drive circuit unit 8 is an analog IC (for example, transimpedance amplifier IC) that amplifies photocurrent of the photo diode while converting voltage.

As illustrated in FIG. 2, the optical input and output unit 4 is implemented as an optical transmission segment including an optical fiber core wire 30 that forms an optical transmission path and a ceramic ferrule 4F that coaxially covers an outer side of the optical fiber core wire 30. An outer diameter of the optical fiber core wire 30 is, for example, 125 μm, and an outer diameter of the ferrule 4F is, for example, 1.25 mm. In the present embodiment, the ferrule 4F is made of partially stabilized zirconia. A cylindrical metal flange 10 is integrally formed on an outer side of an end portion of the ferrule 4F on a coupling side to the metal cover 9 by means such as press fitting, caulking, or shrink fitting. An outer diameter of the metal flange 10 is, for example, 2 mm.

When the optical module is implemented as an optical transmission module 1M, the assembly is performed as follows. That is, one end side of the ferrule 4F is set as a first side, and an opposite side to the first side is set as a second side, a metal sleeve 11 is placed on an outer side of the metal flange 10 provided at an end portion on the second side of the optical input and output unit 4, and the optical semiconductor element 7 implemented as the VCSEL is caused to emit light. Next, the optical input and output unit 4 and the sleeve 11 are aligned with respect to the metal cover 9 along three axes X-Y-Z (for example, an orthogonal coordinate system in which an X-axis is aligned with a normal direction MA of the first main surface MP1 of the metal substrate 6) such that an amount of light output from the optical fiber core wire 30 is maximized. In this state, the metal flange 10 and the metal sleeve 11 are joined by forming a first laser welded portion 23 along an inner peripheral edge on the first side of the metal sleeve 11. Next, by forming a second laser welded portion 21, the metal sleeve 11 is joined to an end surface on the first side of the metal cover 9 outside an outer peripheral edge of the light-passing unit 9P, and the optical input and output unit 4 is fixed onto the metal cover 9.

On the other hand, when the optical module is implemented as an optical reception module 2M, the assembly is performed as follows. That is, one end side of the ferrule 4F is set to the first side, and the opposite side to the first side is set to the second side, the metal sleeve 11 is placed on the outer side of the metal flange 10 provided at the end portion on the second side of the optical input and output unit 4, and laser light is incident on the optical input and output unit 4 from an end portion on the first side via the optical fiber core wire 30. Next, the optical input and output unit 4 and the sleeve 11 are aligned with respect to the metal cover 9 along the three axes X-Y-Z such that photocurrent of the optical semiconductor element 7 formed of a photo diode is maximized. Subsequently, as in the case of the optical transmission module, the first laser welded portion 23 and the second laser welded portion 21 are welded and fixed in this order to fix the optical input and output unit 4 to the metal cover 9.

FIG. 3B illustrates an appearance of the optical transceiver module in a state where the assembly is completed. In Embodiment 1 illustrated in FIG. 1A, each of the optical transmission module 1 and the optical reception module 2 is implemented as a TO-56 type TO-CAN package type module. The high-frequency terminals 31, and a power supply terminal 32P and a control terminal 32C that are connected to the drive circuit unit 8 protrude from the second main surface MP2 of the metal substrate 6. The terminals 32P and 32C do not constitute high-frequency terminals. In the present embodiment, in order to transmit signals of one channel in a differential mode, the high-frequency terminals 31 are provided in a pair. The terminals 31, 32P, and 32C and the drive circuit unit 8 are wire bonded to thin metal wires (for example, gold wires) (not illustrated).

Referring back to FIG. 1A, in the main housing 40 of the optical transceiver 100, a plurality of optical transceiver modules 1 and 2 are assembled such that normal directions MA of the main surfaces of the metal substrate 6 are parallel to each other, an optical connection opening 40H, which is a connection side to the optical input and output unit 4, is formed at an end portion on a first side in the normal direction MA, and a high-frequency connection opening 40K, which is a connection side to the high-frequency terminal 31, is formed separately from the optical connection opening 40H. In the present embodiment, the high-frequency connection opening 40K is provided at an end portion on a second side opposite to the first side in the normal direction MA of the main housing 40, and a formation position of the high-frequency connection opening 40K is not limited thereto.

Two or more optical transmission modules 1 and two or more optical reception modules 2 are assembled to the main housing 40, whereby the optical transceiver 100 can perform optical transmission and reception of a plurality of channels. In Embodiment 1 illustrated in FIG. 1A, two optical transmission modules 1 and two optical reception modules 2 are alternately arranged such that central axes of optical input and output units 4 (S) and 4 (P) are located on the same plane. When the pairs of the optical transmission modules 1 and the optical reception modules 2 that are adjacent to each other are divided from an upper side of the drawing, in each of an upper module pair and a lower module pair, the optical transmission module 1 is defined as a first optical module (hereinafter, also referred to as a first optical module 1), the optical reception module 2 is defined as a second optical module (hereinafter, also referred to as a second optical module 2), and the main housing 40 is provided with first holding units 15A and 48 that hold the first optical module 1 and second holding units 15B and 47 that hold the second optical module 2.

As illustrated in FIG. 1B, a length in the normal direction MA of the optical transmission module constituting the first optical module 1 is, for example, 3.5 mm, and a length in the normal direction MA of the optical reception module constituting the second optical module 2 is, for example, 3.2 mm. This is mainly because types of the optical semiconductor element 7 and the drive circuit unit 8 that are mounted on the metal substrate 6 in FIG. 3A are different between the optical transmission module and the optical reception module.

Next, the second holding units 15B and 47 hold the second optical module 2 in a positional relation in which the module body 2M of the second optical module 2 is located on the first side relative to the module body 1M of the first optical module 1, and an outer peripheral edge of the module body 2M of the second optical module 2 enters a region QS located between an outer peripheral edge of the module body 1M of the first optical module 1 and an outer peripheral edge of the optical input and output unit 4 (S) of the first optical module 1 in projection onto a virtual plane PP (see FIG. 1A) orthogonal to the normal direction MA. Specific configurations of the first holding units 15A and 48 and the second holding units 15B and 47 will be described in detail.

By disposing the pair of first optical module 1 and second optical module 2 in such a positional relation as described above, an inter-terminal distance W of the optical input and output unit, e.g., distance between the axes of the optical input and output units, can be reduced. That is, it is possible to more compactly incorporate the plurality of optical modules 1, 2 into the main housing 40 while inheriting a configuration of a metal-sealed optical module illustrated in FIGS. 2 and 3B and used in an LC-type connector or the like.

In FIG. 1A, the first optical module 1 is implemented as an SFP optical transmission module, and the second optical module 2 is implemented as an SFP optical reception module. That is, unlike an optical transmission module for QSFP, since the optical transmission module for QSFP has a single channel structure, an internal structure is simple without a filter module or the like for multiplexing or demultiplexing, manufacturing yield is high and a failure rate is also low compared with the optical transmission module for QSFP. There is also an advantage that, when any of the plurality of optical modules fails, the failure can be easily recovered by replacing the optical module. That is, not only maintainability of the optical transceiver is improved, but also maintenance cost can be reduced.

In particular, in the configuration of FIG. 1A, an outer peripheral edge of the metal substrate of the second optical module 2 is disposed close to a position facing an outer peripheral surface of the optical input and output unit 4 (S) of the first optical module 1. Accordingly, in the projection onto the virtual plane PP, a distance W between the axes of the optical input and output unit 4 (S) of the first optical module 1 and the optical input and output unit 4 (P) of the second optical module 2 is set to be smaller than a maximum diameter D of the module bodies 1M and 2M of the first optical module 1 and the second optical module 2, and a dimensional reduction effect of the optical transceiver 100 in an arrangement direction of the optical modules is further enhanced. In the embodiment illustrated in FIG. 1A, referring also to FIG. 1B, the maximum diameter D described above is an outer diameter (q 5.6 mm) of the metal substrate 6, and the distance W between the axes is set to 3.1 mm or 3.8 mm as an example.

In the configuration of FIG. 1A, the first holding units 15A and 48 and the second holding units 15B and 47 of the main housing 40 hold the first optical module 1 and the second optical module 2 such that an end surface on the first side of the optical input and output unit 4 of the first optical module 1 and an end surface on the first side of the optical input and output unit 4 of the second optical module 2 are located on the same plane defined as an optical reference plane ORP. Accordingly, for example, when a module body of an optical module is made of a commercially available product, a data transmission error caused by an optical system can be kept within a range defined by specifications of the commercially available product. By setting a value TL2 of the second optical module 2 to be shorter than a value TL1 of the first optical module 1 with respect to a total length of an optical input and output unit from the optical reference plane ORP to an optical coupling surface of the light-passing unit 9P, the module body 2M of the second optical module 2 can be located closer to the first side than the module body 1M of the first optical module 1, and the module body 2M of the second optical module 2 can be disposed close to the optical input and output unit 4 (S) of the first optical module 1 while avoiding interference between the module body 1M and the module body 2M.

The optical transceiver 100 is implemented as a receptacle in which an SN connector 500 is fitted inside on an optical connection opening 40H side. When the SN connector 500 is inserted into and fitted into the optical connection opening 40H of the optical transceiver 100, optical transmission segments (in the configuration of FIG. 1A, reference numerals 5 and 4 (P) to be described later) constituting optical reference plane ORP sides of the first optical module 1 and the second optical module 2 are pressed and brought into contact with optical transmission segments 25 on an SN connector 500 side due to a biasing force in an axial direction by an elastic member (spring or the like) (not illustrated) incorporated in the SN connector 500 side, and an optical coupling state is formed.

Figure 4A:
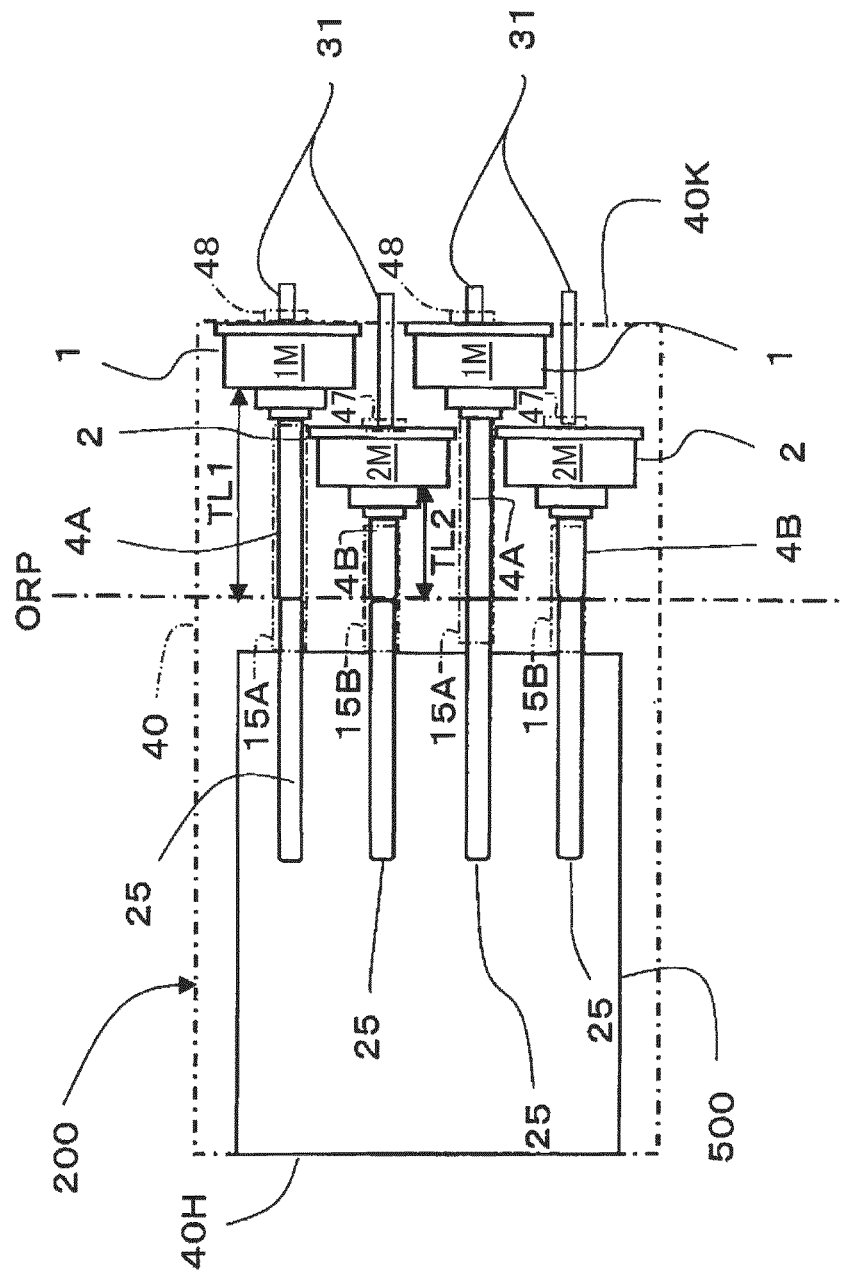
FIG. 4A is a diagram schematically illustrating a modification of the optical transceiver in FIG. 1A.
Figure 4B:
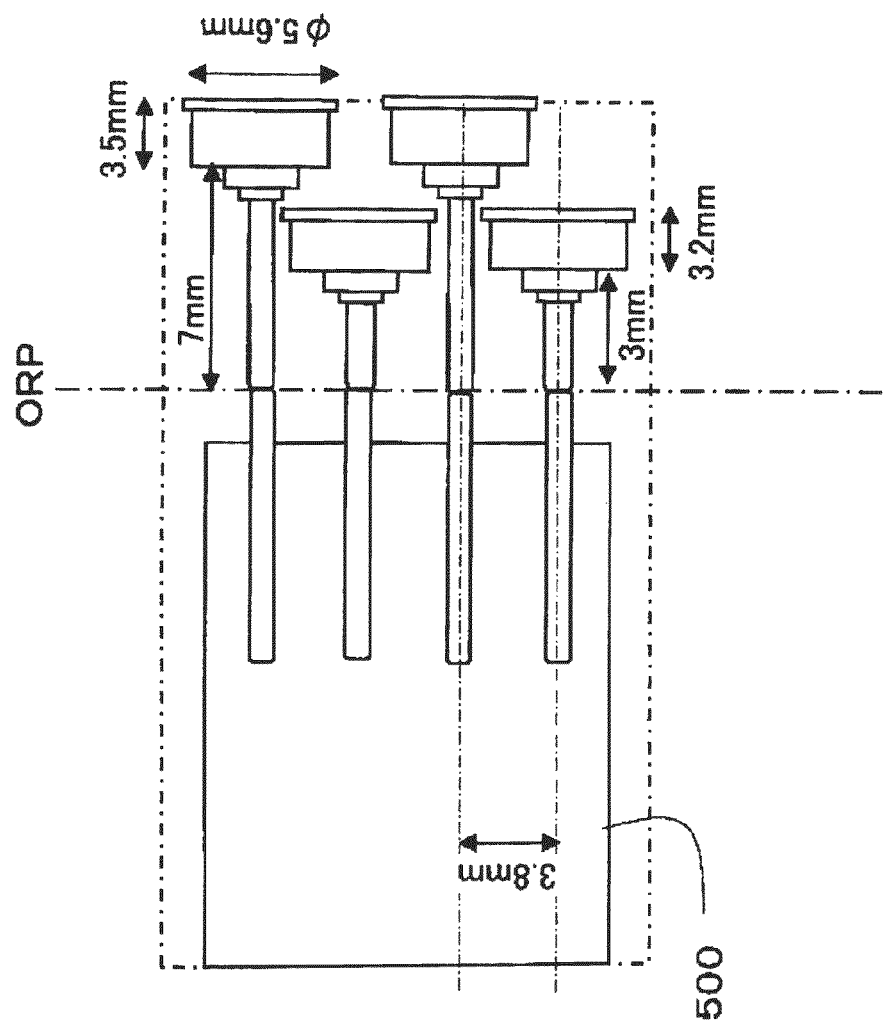
FIG. 4B is a diagram illustrating an example of a dimensional relation of main parts according to a modification of the optical transceiver in FIG. 4A.

As illustrated in FIG. 1A, a total length (first total length) TL1 of the optical input and output unit of the first optical module 1 is larger than a total length (second total length) TL2 of the optical input and output unit of the second optical module 2. In this case, as illustrated in FIG. 4A, the optical input and output units of the first optical module 1 and the second optical module 2 may be formed as single optical transmission segments 4A and 4B, respectively. In FIG. 4A, as illustrated in FIG. 4B, the first total length TL1 is 7 mm and the second total length TL2 is 3 mm. In this configuration, two types of optical transmission segments 4A and 4B to be aligned and fixed in the module body 1M of the first optical module 1 and the module body 2M of the second optical module 2 are prepared with greatly different dimensional specifications.

For example, when a specification of an optical transceiver in which the module body 1M and the module body 2M are assembled at the same position in the normal direction of the metal substrate 6 (FIG. 2 and the like) as in the related art is desired to be changed to a configuration of the optical transceiver in FIG. 4A, it is possible to set optical transmission segments forming the optical input and output unit of either the first optical module 1 or the second optical module 2 to the same length as that before the specification change (that is, the optical transmission segments having a length before the specification change are used). However, on the other one of the optical input and output unit of the first optical module 1 or the second optical module 2, new optical transmission segments having different lengths are prepared and aligned and fixed to the corresponding module body.

In this case, in particular, in the case of a design that uses the optical transmission segment before the specification change (or uses an optical transmission segment of a size close thereto) for the optical transmission segment 4B of the second optical module 2, it is necessary to prepare a new optical transmission segment that is significantly longer than the optical transmission segment 4B for the optical transmission segment 4A of the first optical module 1. In particular, when the optical transmission segment includes a ceramic ferrule such as zirconia, a yield of firing and processing when manufacturing a small-diameter and long ceramic ferrule with high dimensional accuracy is low, and thus there is a disadvantage that an increase in cost easily occurs.

Therefore, the configuration illustrated in FIG. 1A can be adopted. That is, the optical input and output unit of the second optical module 2 is formed as a single second module optical input and output unit 4 (P). The second module optical input and output unit 4 (P) is in charge of only a section of the second total length TL2 from an optical coupling surface of the module body 2M of the second optical module 2 to the optical reference plane ORP, and the end portion on the second side is integrally joined to the metal cover 9, for example, by the structure illustrated in FIG. 3A and FIG. 3B.

On the other hand, the optical input and output unit of the first optical module 1 is divided into a first module optical input and output unit 4 (S) and a short optical fiber ferrule 5. The first module optical input and output unit 4 (S) is formed shorter than a section length of the first total length TL1 from an optical coupling surface of the module body 1M of the first optical module 1 to the optical reference plane ORP, and the end portion on the second side is integrally joined to the metal cover 9. The short optical fiber ferrule 5 has a length corresponding to a difference between the first total length TL1 and a total length of the first module optical input and output unit 4 (S), and is disposed such that an end surface on the first side is aligned with the optical reference plane ORP. An end surface on the second side of the short optical fiber ferrule 5 is optically coupled to an end surface on the first side of the first module optical input and output unit 4 (S).

According to the above configuration, the second module optical input and output unit 4 (P) on a second optical module 2 side and the first module optical input and output unit 4 (S) on a first optical module 1 side can both be formed to be short by separately forming a section corresponding to the difference between the first total length TL1 and the total length of the first module optical input and output unit 4 (S) as the short optical fiber ferrule 5 on the first optical module 1 side. For example, it is possible to use the short optical fiber ferrule 5 having the same length as that before the specification change. Although it is necessary to newly prepare the short optical fiber ferrule 5, the short optical fiber ferrule 5 can also be significantly shorter than the first total length TL1.

In particular, when the optical transmission segment includes a ceramic ferrule such as zirconia, according to the above configuration, all the optical transmission segments can be formed to be relatively short. Therefore, the yield of firing and processing is also good, and it is difficult to cause an increase in cost. Since both the second module optical input and output unit 4 (P) and the first module optical input and output unit 4 (S) are short, accuracy of aligning and fixing to the module body is easily secured.

The second module optical input and output unit 4 (P), the first module optical input and output unit 4 (S), and the short optical fiber ferrule 5 are formed to have two or more of the same length, and thus it is possible to achieve common use of parts and contribute to cost reduction. In the example illustrated in FIGS. 1A and 1B, the second module optical input and output unit 4 (P) and the first module optical input and output unit 4 (S) are formed to have the same length. In the configuration of FIG. 1A, when lengths of the second module optical input and output unit 4 (P) and the first module optical input and output unit 4 (S) are designed to be extended by 1 mm by moving the respective module bodies 1M and 2M to the second side by 1 mm, all of the second module optical input and output unit 4 (P), the first module optical input and output unit 4 (S), and the short optical fiber ferrule 5 may have the same length.

As illustrated in FIG. 1A, the second optical module 2 is offset from the first optical module 1 to the first side. An offset length L (see FIG. 1B) can be defined as a distance between the second main surface MP2 of the metal substrate 6 of the first optical module 1 and the second main surface MP2 of the metal substrate 6 of the second optical module 2 in the normal direction MA. Accordingly, it is clear that a length of the high-frequency terminal 31 corresponds to the offset length L, and the length of the high-frequency terminal 31 in the second optical module 2 is longer than that in the first optical module 1. Considering circumstances of transmission of high-frequency signals in the high-frequency terminal 31, it is not desirable to increase the offset length L without limit. A reason for this is that as the frequency of the signal flowing through the high-frequency terminal 31 increases, a skin effect of conductor current becomes more remarkable, and transmission loss significantly increases. Unnecessarily lengthening the high-frequency terminal 31 may cause a loss of squareness of the transmitted and received pulse waveforms mainly due to an influence of the parasitic capacitance and parasitic inductance of the high-frequency terminal 31 itself.

In particular, when the first optical module 1 and the second optical module 2 perform signal transmission and reception in a frequency band of 5 GHz or more, the length of the high-frequency terminal 31 is preferably set to 2 mm or less from the viewpoint of preventing the above-described problem while avoiding contact between the adjacent first optical module 1 and second optical module 2. The length of the high-frequency terminal 31 is more preferably set to 1 mm or less. A lower limit of the length of the high-frequency terminal 31 is, for example, 0.3 mm. However, since dimensional reduction of a module body of an optical module to be used is limited, it is extremely difficult to set the offset length L to 2 mm or less. In other words, it is extremely difficult in terms of design to cover the offset length L only with the high-frequency terminal 31 of 2 mm or less.

Figure 13:
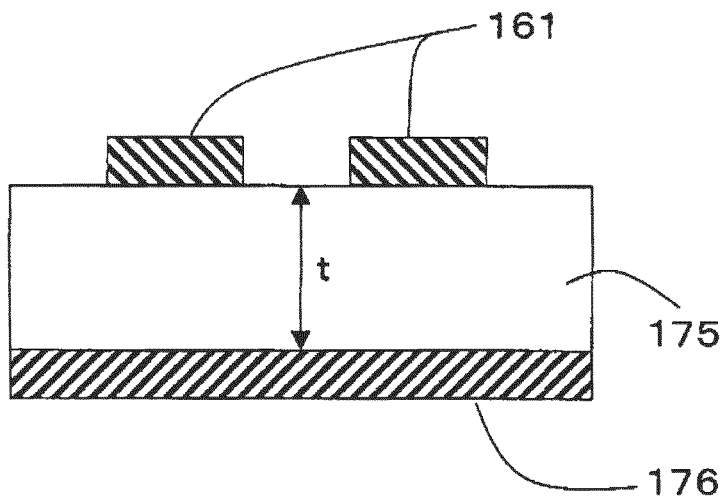
FIG. 13 is a sectional view illustrating a first example of a high-frequency waveguide member.
Figure 14:
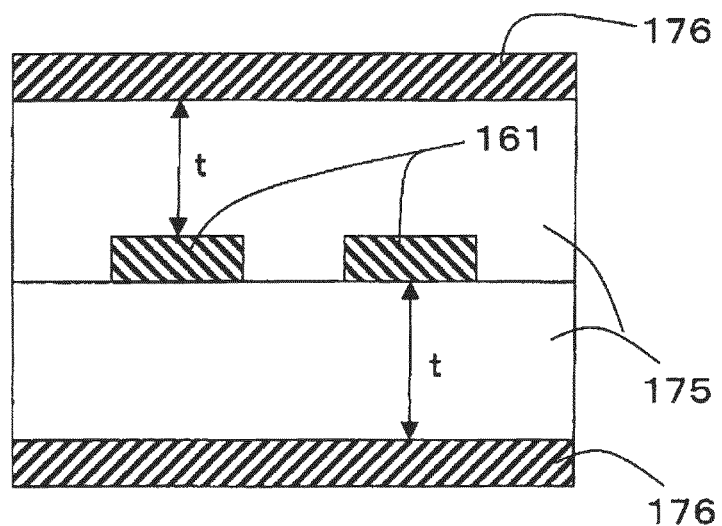
FIG. 14 is a sectional view illustrating a second example of the high-frequency waveguide member.
Figure 15:
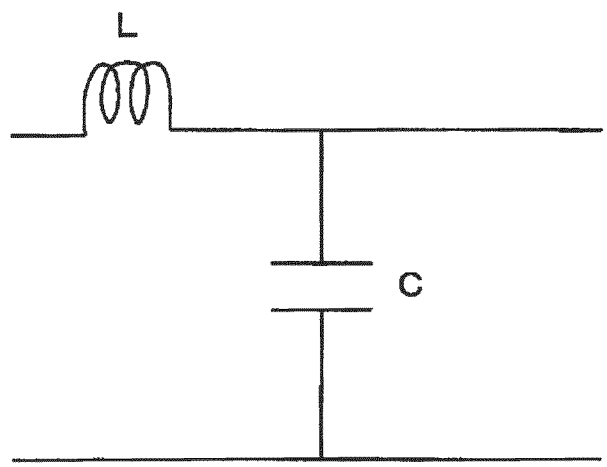
FIG. 15 is an equivalent circuit diagram of the high-frequency waveguide member.

Therefore, in the present invention, it is preferable that the high-frequency terminal 31 is formed to be shorter than the offset length L such that the high-frequency terminal 31 of the second optical module 2 is in charge of only a partial section of the offset length L, and a high-frequency waveguide member that includes a dielectric substrate, a signal transmission line formed on the dielectric substrate, and a ground conductor formed on the dielectric substrate and shielding the signal transmission line is in charge of the remaining section of the offset length L. Such a high-frequency waveguide member can adopt, for example, as illustrated in FIG. 13, a high-frequency waveguide member having a microstrip line structure in which signal transmission line layers 161 are formed on one main surface of a dielectric layer 175 forming the dielectric substrate and a ground conductor layer 176 is formed on the other main surface of the dielectric layer 175, as illustrated in FIG. 14, a high-frequency waveguide member having a strip line structure in which the signal transmission line layers 161 are sandwiched between two laminated dielectric layers 175, 175 and ground conductor layers 176, 176 are formed on both surfaces of the laminated body, or a high-frequency waveguide member having a coplanar line structure (not illustrated).

In such a high-frequency waveguide member, based on a width of the signal transmission line layer 161 and a dielectric constant of the dielectric layer 175, characteristic impedance of the signal transmission line layer 161 can be accurately matched with a design value (for example, a single layer 50 (2 or a difference 100 (2), and a reflection loss of the high frequency due to the impedance discontinuity can be reduced. Furthermore, by selecting a dielectric having a small dielectric loss tangent in a frequency band of a signal to be used and using the selected dielectric as the dielectric layer 175, it is possible to reduce an increase in transmission loss of the signal transmission line layer 161. As will be described later, in FIGS. 5 and 6B in Embodiment 2, the high-frequency waveguide member is implemented as flexible printed circuit (FPC) boards 16A and 16B in which the dielectric layer 175 is an insulating resin sheet and the signal transmission line layer 161 and the ground conductor layer 176 are metal foil layers.

The high-frequency waveguide member of the second optical module 2 is formed longer than the remaining section of the offset length L in order to connect the optical transceiver 100 to an external device or an accompanying device such as a printed circuit board (detailed in Embodiment 2 below: reference numeral 17 in FIGS. 6A and 6B). However, when a frequency band for signal transmission is set to a frequency band (for example, 25 GHz) of a quasi-millimeter band of 10 GHz or more and 30 GHz or less, there is a possibility that an increased transmission loss proportional to a signal frequency occurs due to an inductance component of a signal transmission line even when the high-frequency waveguide member is adopted. From this point of view, when the frequency band is adopted, it is desirable that the total length of the high-frequency waveguide member is kept at 20 mm or less. The high-frequency waveguide member on the second optical module 2 side is in charge of not only a distance from the module body 1M to the accompanying device (for example, the board 17 in FIG. 6A and FIG. 6B) but also a distance corresponding to a difference between the offset length L and the high-frequency terminal 31. Therefore, an upper limit of the offset length L may be set within, for example, 15 mm. Preferably, the upper limit of the offset length L is set within 10 mm. The offset length L is set to be larger than a length of the module body of the first optical module such that the first optical module 1 and the second optical module 2 do not come into contact with each other.

Hereinafter, a configuration of an optical transceiver into which more optical modules are incorporated will be described. The same components as those in Embodiment 1 are denoted by the same reference numerals, and detailed description thereof may be omitted.

Embodiment 2

Figure 5:
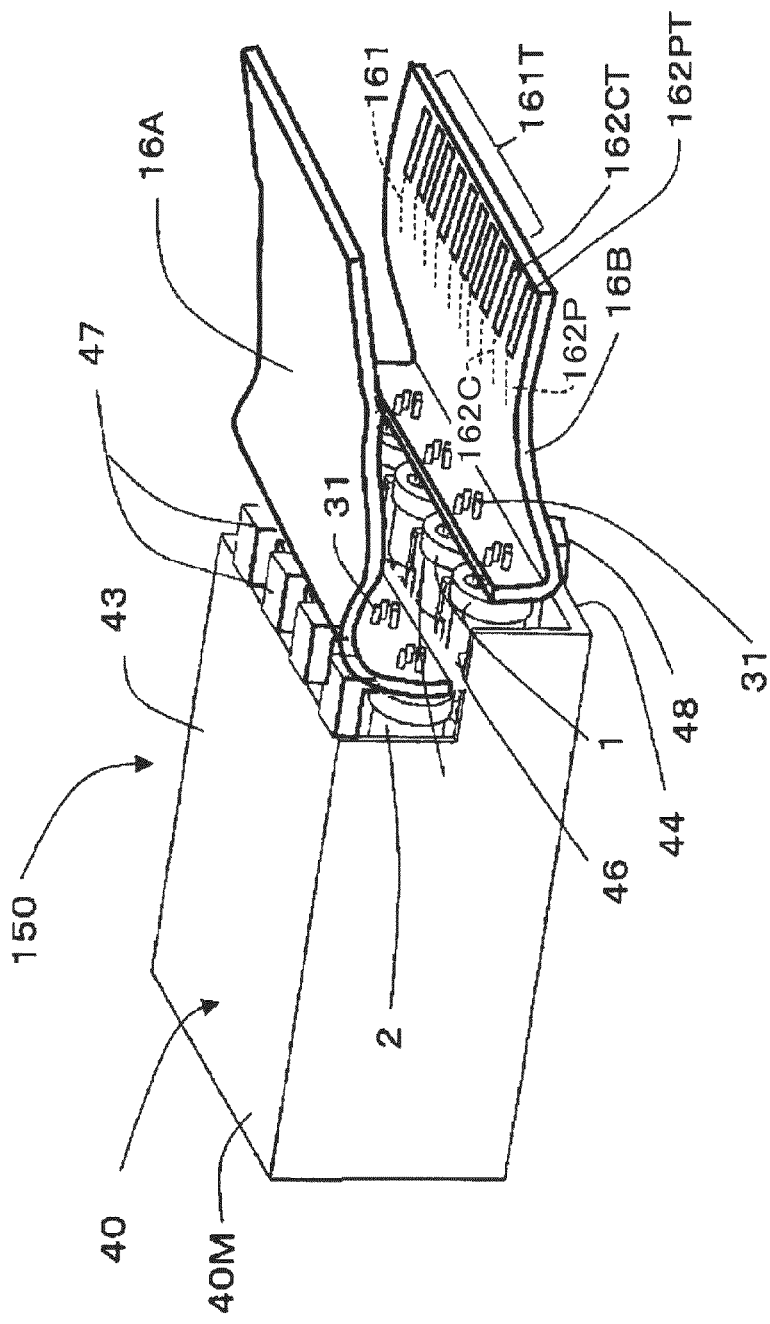
FIG. 5 is a perspective view of an optical transceiver according to Embodiment 2 of the present invention.
Figure 6A:
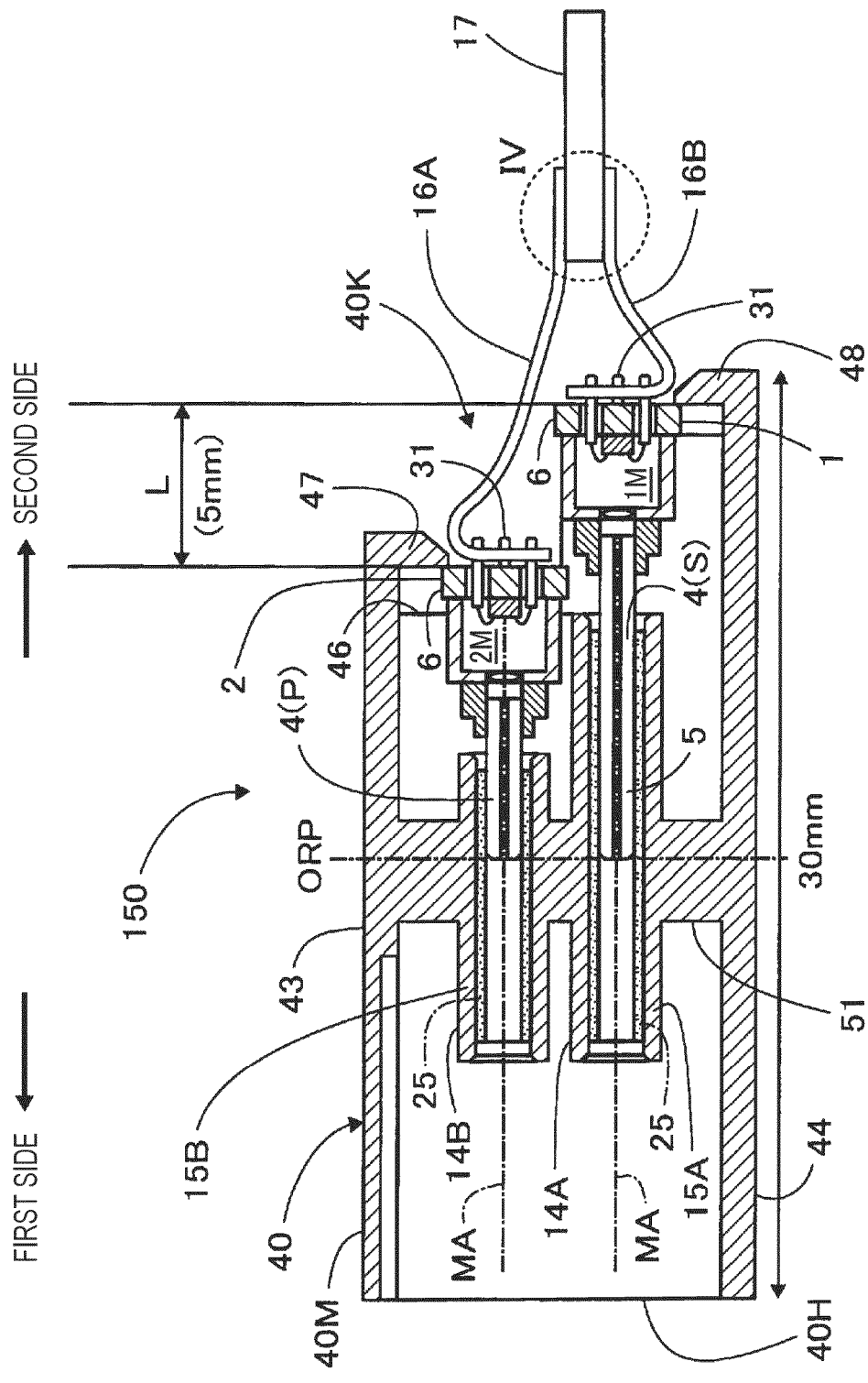
FIG. 6A is a side sectional view of the optical transceiver in FIG. 5.
Figure 6B:
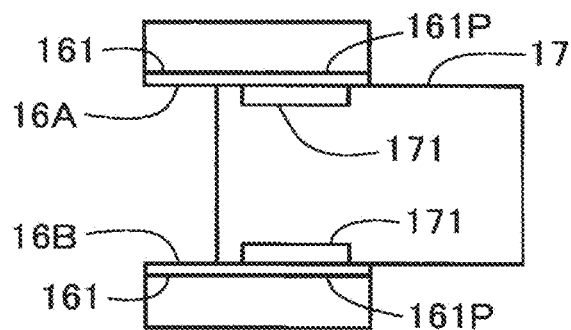
FIG. 6B is an enlarged view of a portion IV in FIG. 6A.
Figure 7:
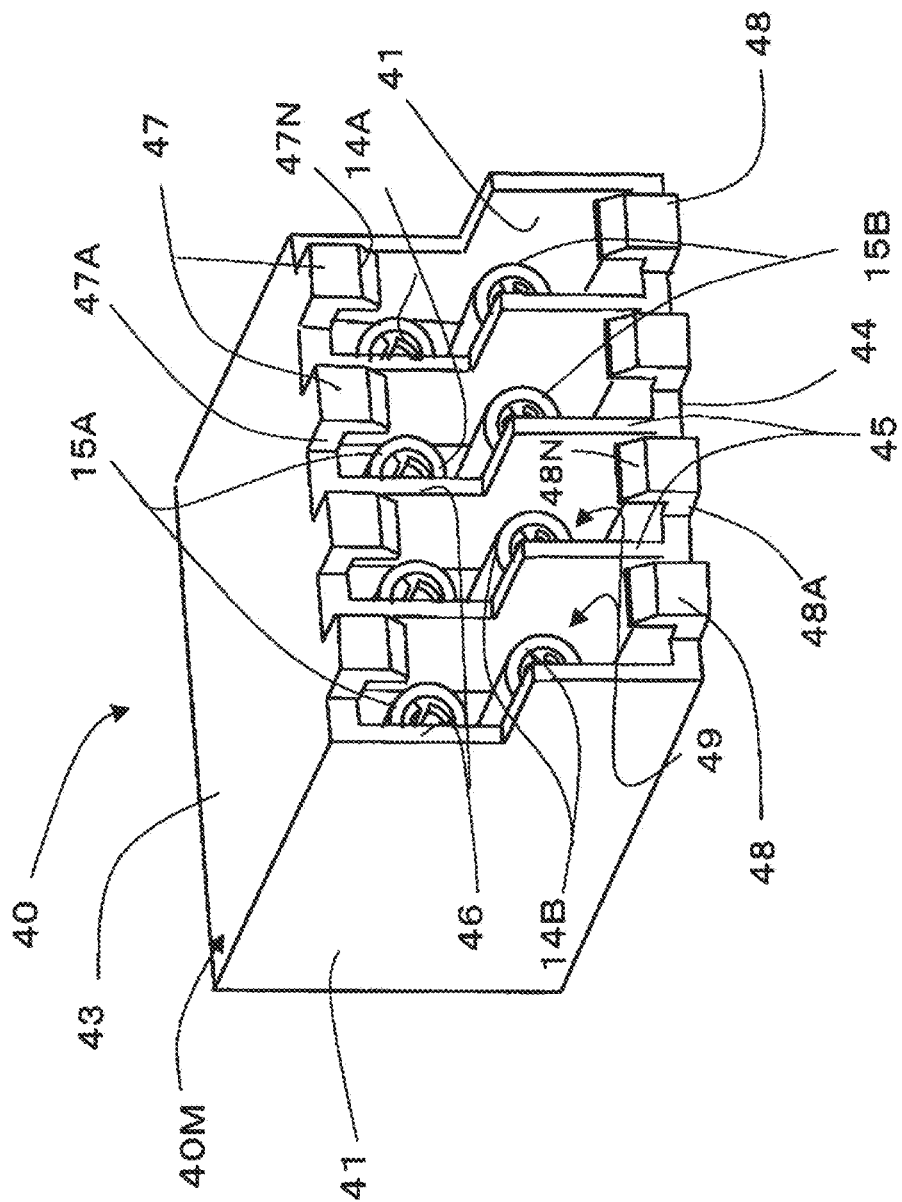
FIG. 7 is a perspective view illustrating a main housing of the optical transceiver in FIG. 6A.
Figure 8:
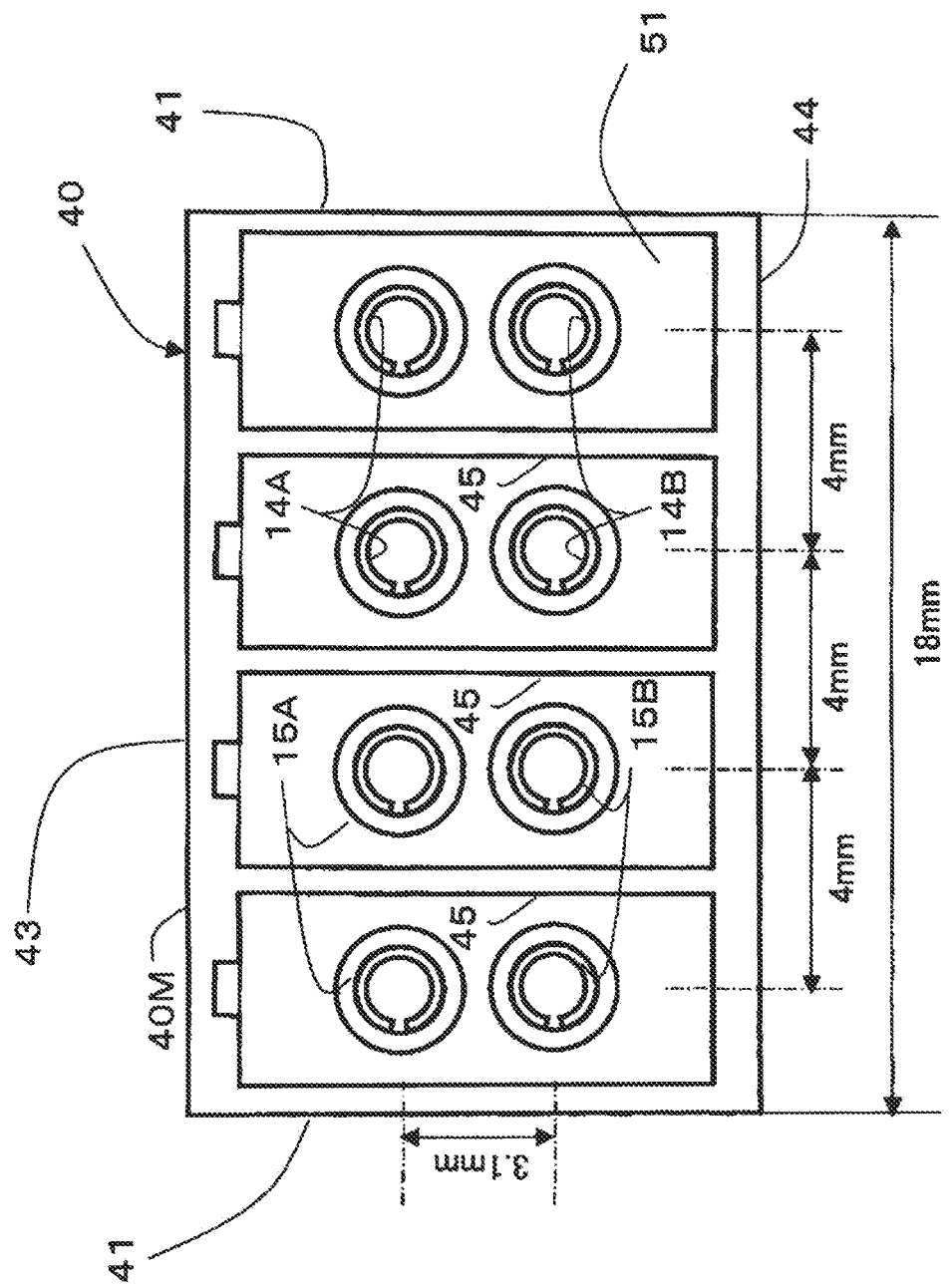
FIG. 8 is a rear view of the main housing in FIG. 7 when viewed from an optical connection side.

FIGS. 5 to 8 show an embodiment of an optical transceiver 150 in which a basic concept of the present invention is realized in the same manner as the optical transceiver according to Embodiment 1, and the number of pairs of the optical transmission module and the optical reception module incorporated into the main housing is two or more (four pairs in the present embodiment). FIG. 5 is a perspective view of the optical transceiver 150, FIG. 6A is a side sectional view, FIG. 6B is an enlarged view of a portion IV in FIG. 6A, FIG. 7 is a perspective view illustrating only the main housing 40, and FIG. 8 is a rear view illustrating a structure on an optical connection opening 40H side.

The main housing 40 of the optical transceiver 150 includes a housing body 40M, which is an injection-molded body made of resin. The housing body 40M may be a die-cast member made of metal. As illustrated in FIGS. 7 and 8, the housing body 40M includes a top wall portion 43, a bottom wall portion 44, and a pair of side wall portions 41, 41. As illustrated in FIGS. 5 and 6A, when an opposing direction of the pair of side wall portions 41, 41 is a width direction of the housing body 40M, a plurality of (four in the present embodiment) first optical modules 1 are disposed on a bottom wall portion side 44 on an inner side of the housing body 40M, and the same number of second optical modules 2 as the first optical modules 1 are disposed in the width direction on a top wall portion side 43.

As in the first embodiment, the first optical module 1 is an optical transmission module, and the second optical module 2 is an optical reception module. The optical transceiver 150 having this configuration can handle transmission and reception of optical signals of a plurality of channels, and each pair of the first optical module 1 and the second optical module 2 has the same arrangement as those of Embodiment 1, so that the entire configuration is compact. A dimension of the main housing 40 is, for example, 18 mm in width, 10 mm in height, 30 mm in length, and in this case, the width and height are almost the same as those of a general QSFP optical transceiver, and the length is about ⅓ of that of a general QSFP optical transceiver.

As illustrated in FIGS. 5 and 6A, the plurality of first optical modules 1 are disposed in parallel at predetermined intervals in a width direction of the bottom wall portion 44 inside the housing body 40M. The plurality of first optical modules 1 are disposed such that positions of the module bodies 1M at a second side edge (the second main surface of the metal substrate 6) are aligned. The plurality of second optical modules 2 are disposed in parallel at predetermined intervals in a width direction of the top wall portion 43 inside the housing body 40M. The plurality of second optical modules 2 are disposed such that positions of the module bodies 2M at a second side edge are aligned. A set of the module main bodies 2M of the second optical module 2 on an upper side of the drawing is offset to the first side with respect to a set of the module main bodies 1M of the first optical module 1 on a lower side of the drawing, thereby forming a staircase pattern as a whole. In the present embodiment, the first optical transmission module 1 and the second optical reception module 2 are implemented as TO-38 type TO-CAN package type modules that are more compact than that in Embodiment 1. Each arrangement interval between the first optical module 1 and the second optical module 2 is 4 mm in the present embodiment, and a core wire interval between the first optical module 1 and the corresponding second optical module 2, i.e., the distance between axes is 3.1 mm (see FIG. 8).

The top wall portion 43 of the housing body 40M is cut out at an end portion on the second side such that the module body 1M of the first optical module 1 is exposed. Thus, by cutting out the top wall portion 43, a space above the first optical module 1 is opened, and connection work by soldering or the like to the high-frequency terminal 31 of the second optical reception module 2 is easily performed.

As illustrated in FIGS. 7 and 8, the housing body 40M is provided with partition wall portions 45 that individually partition the first optical modules 1 and the second optical modules 2 (see FIG. 5) which are disposed in the width direction. As illustrated in FIGS. 5 to 7, each partition wall portion 45 is formed with a cutout portion 46 by cutting out a region located on the top wall portion side 43 at the end portion of the second side in the normal direction MA (FIG. 6A) together with the side wall portions 41, 41. As illustrated in FIG. 5, by forming such a cutout portion 46, it is possible to more easily connect a strip-shaped set wiring portion to each high-frequency terminal 31 of the second optical module 2 disposed on the top wall portion side 43 by soldering or the like so as to traverse the second optical module 2. In the present embodiment, the set wiring portion is an FPC board 16A that forms the above-described high-frequency waveguide member. In FIG. 5, an FPC board 16B that traverses each high-frequency terminal 31 of the first optical module 1 is also soldered. The optical transceiver 150 is connected to the external device or the printed circuit board 17 illustrated in FIGS. 6A and 6B through the FPC boards 16A and 16B.

As illustrated in FIG. 5, in the FPC boards 16A and 16B that form the high-frequency waveguide member, the transmission line layer 161 individually connected to a plurality of sets of high-frequency terminals 31 from the corresponding optical modules 2 and 1, a power supply line 162P connected to the power supply terminal 32P (see FIG. 3A and FIG. 3B), and a control signal line 162C connected to the control terminal 32C (see FIG. 3A and FIG. 3B) are collectively formed on a common dielectric layer. Pad groups 161T, 162PT, and 162CT for soldering are provided at respective ends of the transmission line layer 161, the power supply line 162P, and the control signal line 162C. The pad groups 161T, 162PT, and 162CT are formed on main surfaces of the FPC boards 16A and 16B that face each other. The pad groups 161T, 162PT, and 162CT are soldered to corresponding ones of board-side pads 171, 171 formed separately on the front and back of the printed circuit board 17, or attached to FPC connectors mounted on the board 17 and connected.

As illustrated in FIG. 6A, in the main housing 40, the first holding unit described in Embodiment 1 includes a cantilever support unit 15A and a module movement restricting unit 48. Similarly, the second holding unit includes a cantilever support unit 15B and a module movement restricting unit 47. Each of the cantilever support units 15A and 15B is formed in a cylindrical shape with both ends open and fixed to an inner surface of the housing body 40M in such a manner that each central axis coincides with the normal direction MA. As the optical input and output units (reference numerals 4 (S), 5, and 4 (P)) of the optical modules 1 and 2 are inserted through end portion openings on the second side of the cantilever support units 15A and 15B, the optical modules 1 and 2 are supported on the cantilever support units 15A and 15B in a cantilever manner in a state where the module bodies 1M and 2M are protruded from the end portion openings of the cantilever support units 15A and 15B. The module movement restricting units 48 and 47 are formed in an opening peripheral edge portion of the high-frequency connection opening 40K of the housing body 40M. Movement of the optical modules 1 and 2 to the second side in the normal direction MA is restricted by the module movement restricting units 48 and 47 coming into contact with the second main surfaces of the metal substrates 6 of the optical modules 1 and 2. With this configuration, the optical modules 1 and 2 can be easily assembled to the main housing 40 in such a manner that the optical input and output units are inserted into the cantilever support units 15A and 15B.

The cantilever support units 15A and 15B are formed in a positional relation in which end portion openings on the first side are aligned with each other in the normal direction MA. On the other hand, the end portion opening on the second side of the cantilever support unit 15B of the second holding unit and the module movement restricting unit 47 are formed so as to be spaced apart from the end portion opening on the second side of the cantilever support unit 15A of the first holding unit and the module movement restricting unit 48 on the first side. Accordingly, as illustrated in FIG. 6A, it is possible to easily realize an arrangement in which the second optical module 2 is offset to the first side by the offset length L with respect to the first optical module 1. In the present embodiment, a length of the cantilever support unit 15B is set to be shorter than that of the cantilever support unit 15A by the offset length L. In the present embodiment, the offset length L is 5 mm.

The optical input and output units of the optical modules 1 and 2 are press-fitted and fixed to the cantilever support units 15A and 15B via split sleeves 14A and 14B, respectively. The split sleeve is made of, for example, ceramic such as zirconia. As illustrated in FIGS. 6A and 8, the cantilever support units 15A and 15B together with the partition wall portions 45 are formed integrally with the housing body 40 via wall portions 51 that partition the housing body 40 into the first side and the second side at an intermediate position in a longitudinal direction (normal direction).

As illustrated in FIG. 7, the module movement restricting units 48, 47 include elastic arms 48A, 47A and restricting claws 48N, 47N. A base end side of the elastic arms 48A, 47A is coupled to the high-frequency connection opening 40K of the housing body 40M, and the other end side extends toward the second side in the normal direction MA. The restricting claws 48N and 47N protrude from distal ends of the elastic arms 48A and 47A on the other end side toward an inside of the high-frequency connection opening 40K. With this configuration, the module bodies 1M and 2M of the optical modules 1 and 2 can be easily assembled to the respective restricting positions by utilizing elastic deformation of the elastic arms 48A and 47A.

Figure 9A:
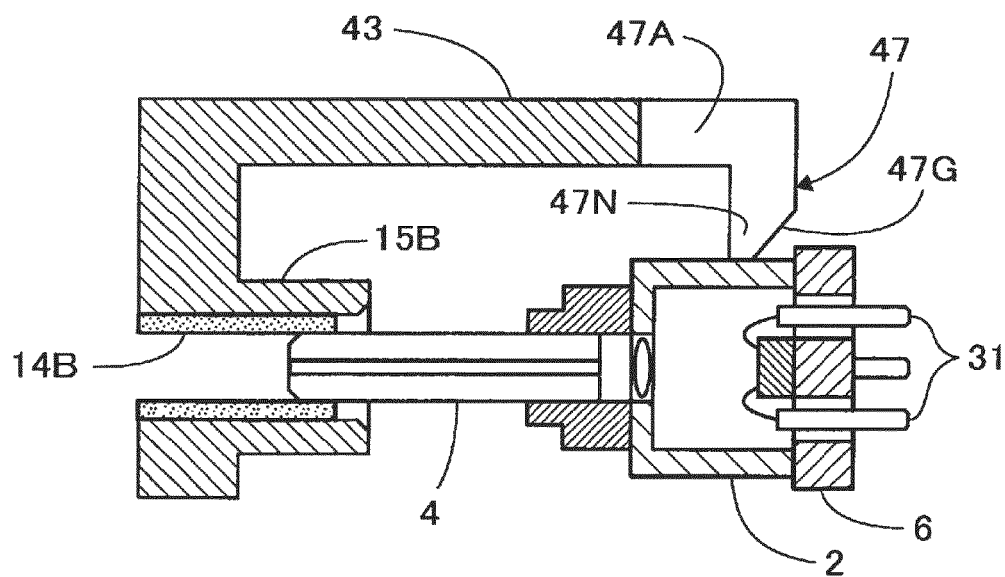
FIG. 9A is a diagram illustrating an initial stage of action of a module movement restricting unit.
Figure 9B:
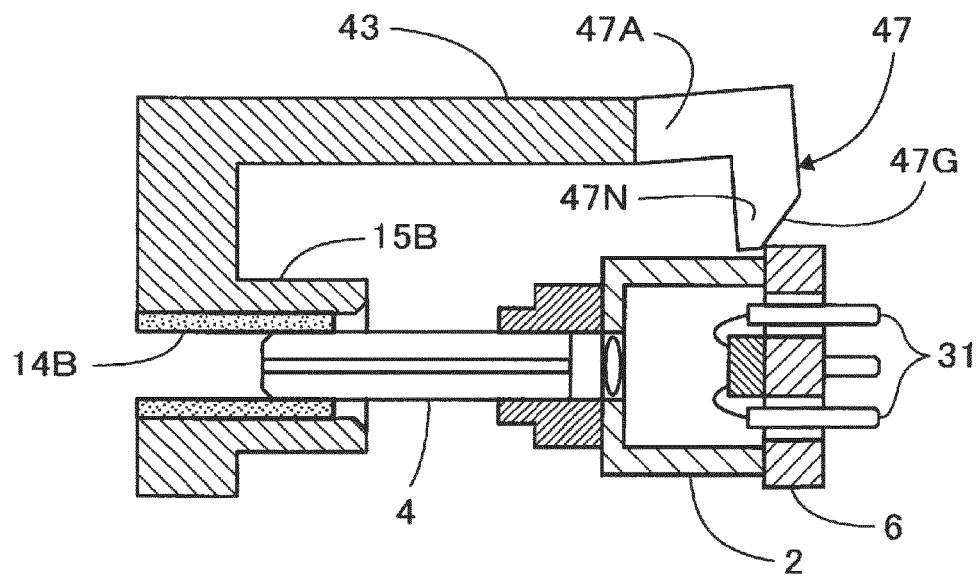
FIG. 9B is a diagram illustrating an intermediate stage of the action of the module movement restricting unit.
Figure 9C:
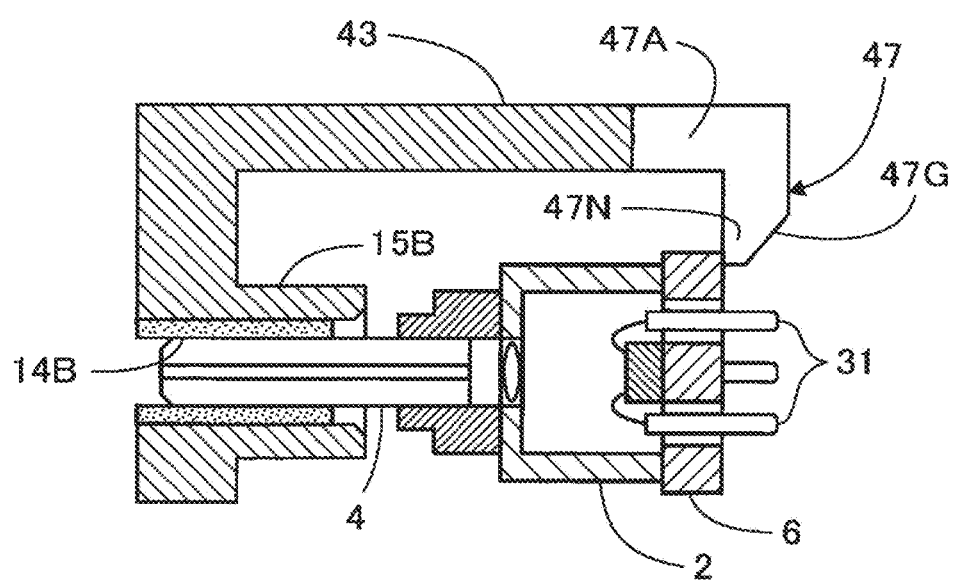
FIG. 9C is a diagram illustrating a completion stage of the action of the module movement restricting unit.

FIGS. 9A, 9B, and 9C illustrate an example of an assembly process as a representative of the second optical module 2 side. That is, as illustrated in FIG. 9A, the module body 2M is advanced to the first side (left side in the drawing) while the optical input and output unit 4 is inserted into the cantilever support unit 15B. Then, as illustrated in FIG. 9B, the outer peripheral edge of the metal substrate 6 of the module body 2M interferes with a lower end portion in the drawing of the restricting claw 47N. When the module body 2M is further pushed in from this state, the restricting claw 47N rides on an outer peripheral surface of the metal substrate 6 while flexing the elastic arm 47. In the example illustrated in FIGS. 9A to 9C, an inclined guide surface 47G that guides the riding on the metal substrate 6 is formed on a lower end portion of the restricting claw 47N on the second side (right side in the drawing). As illustrated in FIG. 9C, when the metal substrate 6 passes through the restricting claw 47N to the first side, the elastic arm 47 elastically returns, and an outer peripheral edge portion of the metal substrate 6 on a second side main surface is regulated by the restricting claw 47N.

According to the configuration of the optical transceiver described above, a plurality of optical transmission modules or optical reception modules which are larger than an inter-core pitch of an optical connector can be installed, and miniaturization, high reliability, and high yield of the multi-core optical transceiver can be realized at low cost.

Figure 10:
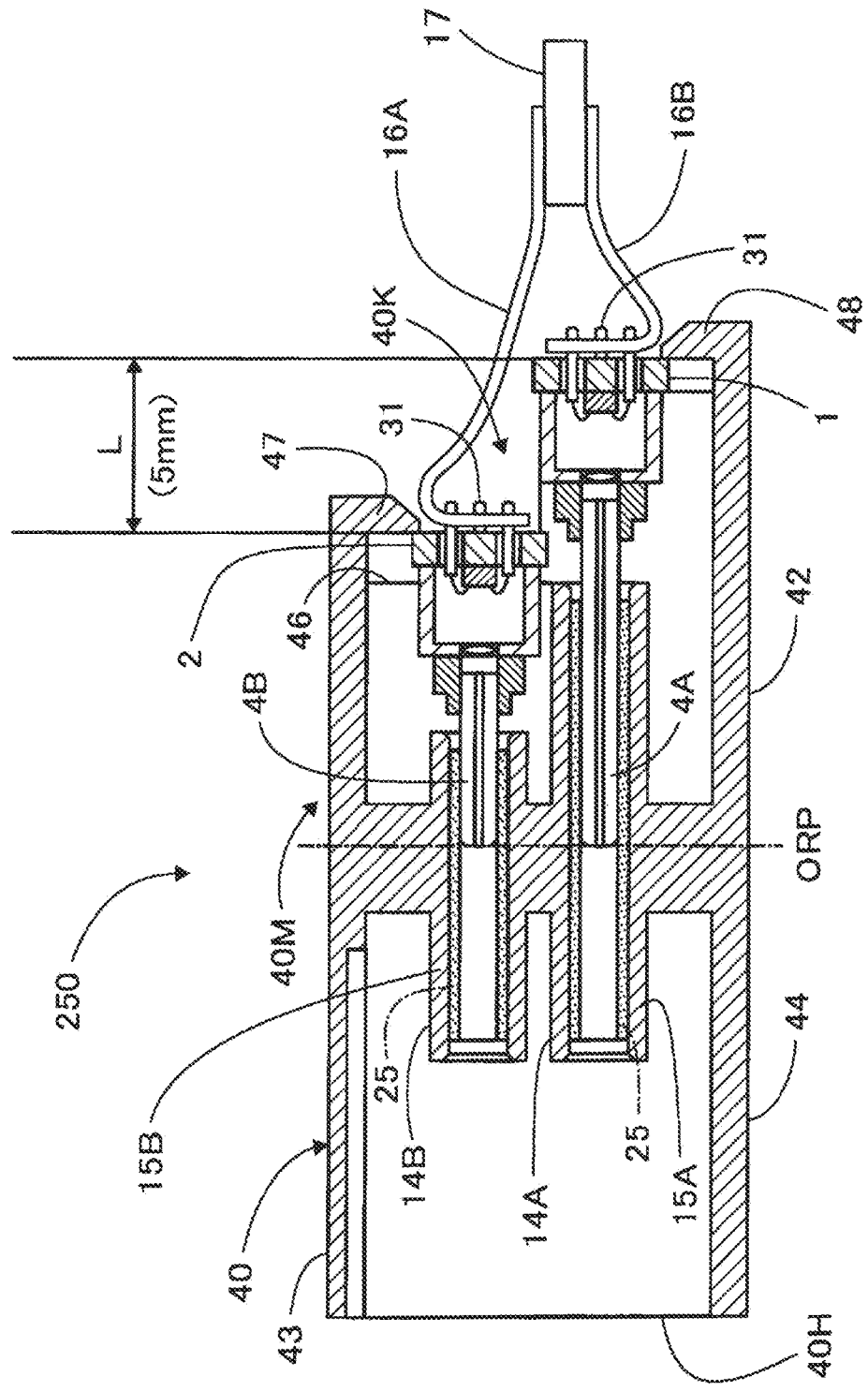
FIG. 10 is a side sectional view illustrating a first modification of the optical transceiver in FIG. 5.

Also in the configuration of the optical transceiver described above, as in the optical transceiver 250 illustrated in FIG. 10, the optical transmission segment 4A of the first optical module 1 and the optical transmission segment 4B of the second optical module 2 can be formed by single optical transmission segments having different lengths. In the configuration, the same components as those in FIG. 6A are denoted by the same reference numerals.

Figure 11:
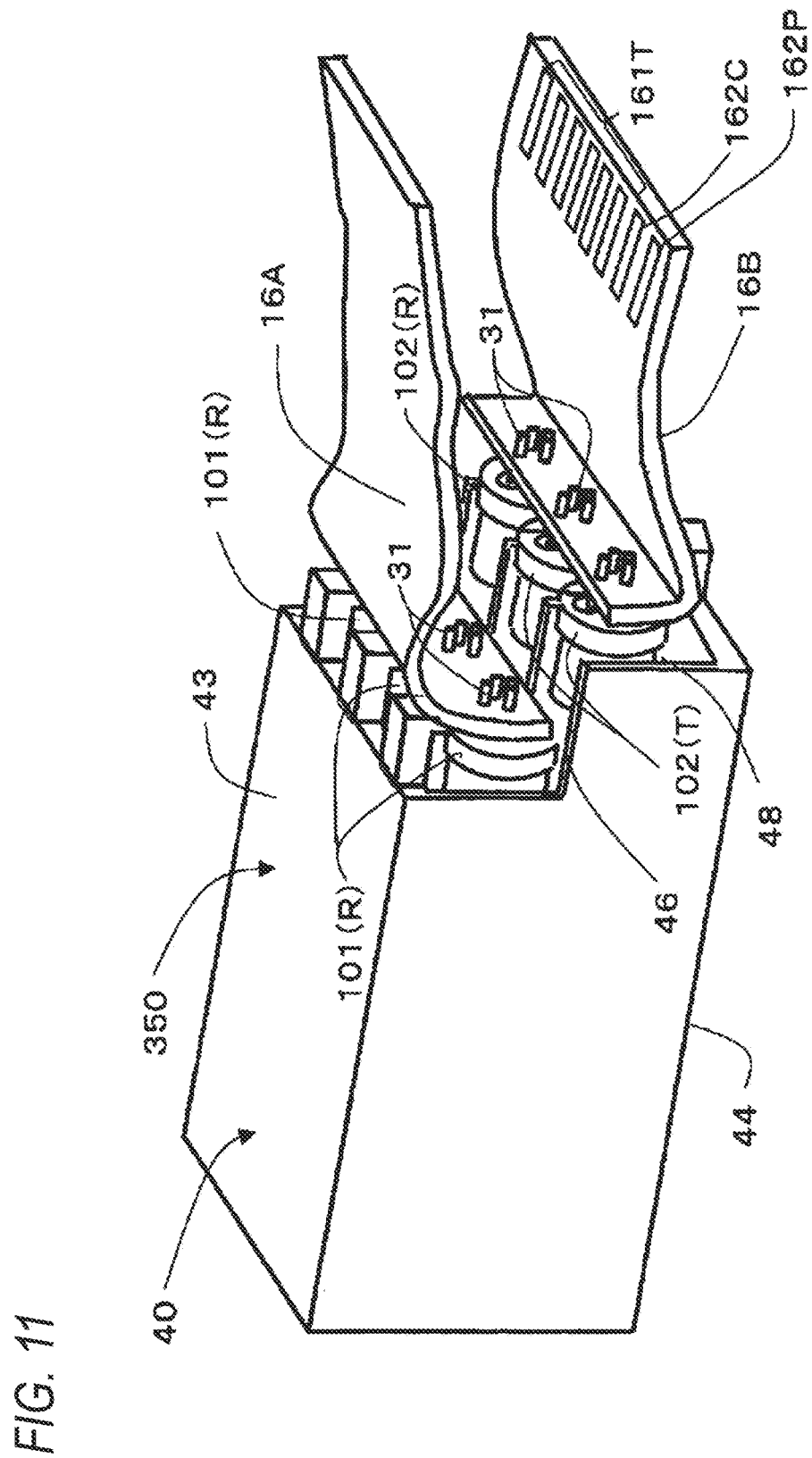
FIG. 11 is a perspective view illustrating a second modification of the optical transceiver in FIG. 5.
Figure 12:
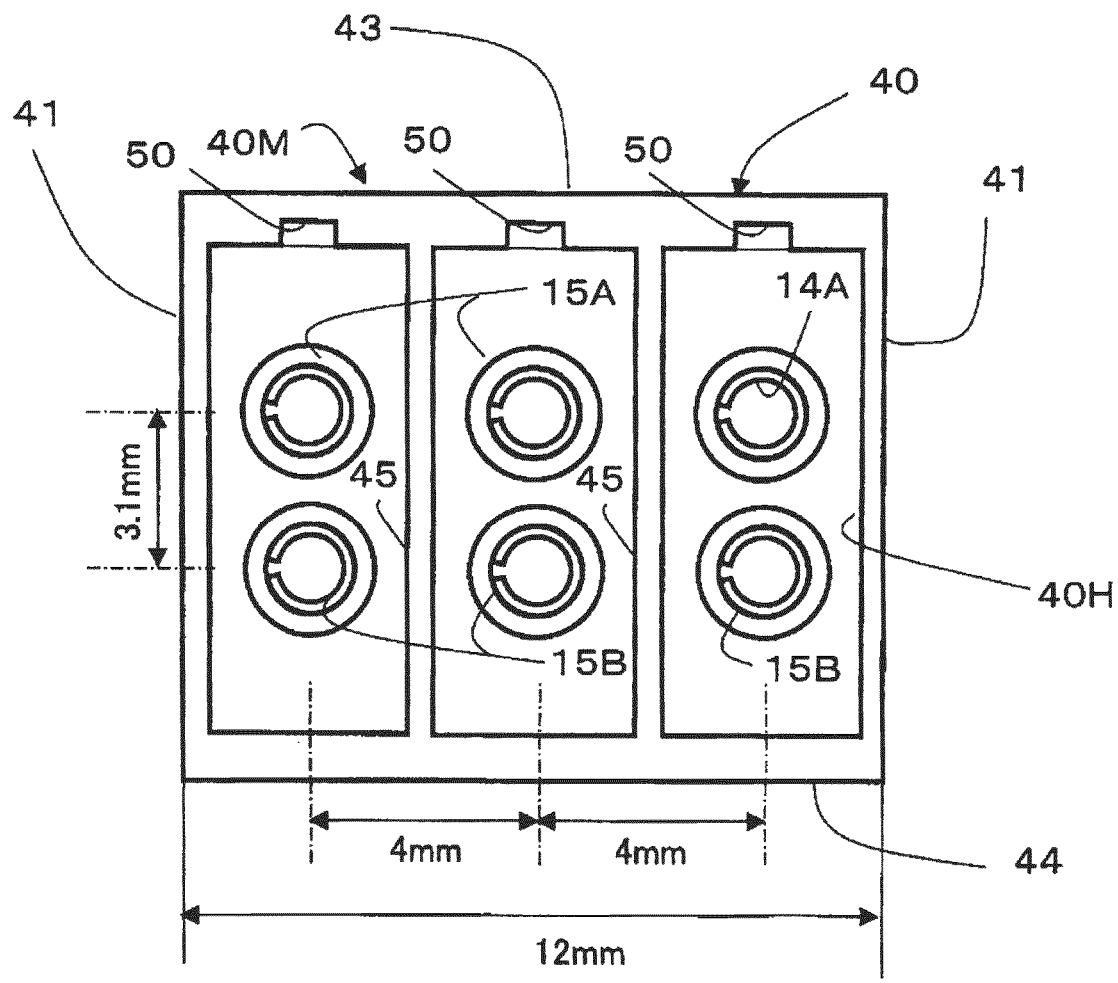
FIG. 12 is a rear view of a main housing of the optical transceiver in FIG. 11 when viewed from the optical connection side.

Further, FIGS. 11 and 12 illustrate an example of an optical transceiver 350 in which the number of the first optical module 101 and the second optical module 102 to be assembled is set to three, respectively, by the same configuration as in FIGS. 5 and 6A. The same components as those in FIGS. 5 and 6A are denoted by the same reference numerals. FIG. 11 is a perspective view of the optical transceiver 350, and FIG. 12 is a rear view illustrating a structure of the main housing 40 on the optical connection opening side 40H. The optical transceiver 350 is different from the optical transceiver 150 in FIGS. 5 to 8 in that the transceiver is implemented for asymmetric optical communication in which not only the number of optical modules to be assembled but also the number of optical transmission modules to be assembled is different from that of the optical reception modules. In FIG. 11, three optical 5 reception modules 101 (R) are disposed on an upper wall portion 43 side, and one optical reception module 102 (R) and two optical transmission modules 102 (T) are disposed on a bottom wall portion 44 side. That is, two optical transmission modules and four optical reception modules realize an asymmetric optical communication transceiver. An optical transceiver in which the number of incorporated optical reception modules and the number of incorporated optical transmission modules are reversed from the above-described configuration can be similarly configured, and by combining with the above-described optical transceiver 350, it is possible to easily form an asymmetric optical communication system and easily realize optimization according to the application.

According to the configuration of the optical transceiver in the present invention, it is easy to customize the number of optical transmission channels and the number of optical reception channels, and as described above, it is possible to easily configure an optical transceiver suitable for asymmetric optical communication with different transmission capacities and reception capacities. Such an asymmetric optical communication transceiver can be used for an optical signal wiring of a high-definition video device such as an 8K camera. That is, an uplink signal from a camera to a video display and a video processing device requires transmission of large-capacity image data, but a downlink signal from the video processing device to the camera is a control signal of the camera, and thus the downlink signal is suitable for a use scene in which low-speed signal transmission is sufficient.

Although the embodiments of the invention have been described above, the embodiments are merely examples, and the invention is not limited thereto.

REFERENCE SIGNS LIST 1 first optical module
1M, 2M module body
2 second optical module
4A, 4B optical transmission segment
4(S) first module optical input and output unit
4(P) second module optical input and output unit
5 short optical fiber ferrule
6 metal substrate
7 optical semiconductor element
8 drive circuit unit
9 metal cover
9P light-passing unit
15A cantilever support unit (first holding unit)
15B cantilever support unit (second holding unit)
31 high-frequency terminal
40 main housing
40H optical connection opening
40K high-frequency connection opening
47 module movement restricting unit (second holding unit)
48 module movement restricting unit (first holding unit)

The invention claimed is:

1. An optical transceiver comprising:
a plurality of optical modules each including a module body and an optical input and output unit; and
a main housing, wherein
the module body includes
    a metal substrate,
    an optical semiconductor element and a drive circuit unit of the optical semiconductor element that are mounted on a first main surface of the metal substrate,
    a high-frequency terminal that has one end electrically connected to the drive circuit unit and the other end side penetrating the metal substrate and extending from a second main surface of the metal substrate and that constitutes an electrical input and output unit of the drive circuit unit,
    a metal cover that is joined to the first main surface of the metal substrate while covering the drive circuit unit, and
    a light-passing unit that is provided on an end surface of the metal cover on a side opposite to a coupling side to the metal substrate and that forms an optical input and output unit of the optical semiconductor element,
the optical input and output unit has one end optically coupled to the light-passing unit and the other end side extending in a direction away from the light-passing unit, and has a diameter smaller than a diameter of the metal cover,
a plurality of the optical modules are assembled to the main housing such that normal directions of the main surfaces of the metal substrate are parallel to each other,
the main housing includes an optical connection opening which is a connection side to the optical input and output unit and is formed on an end portion on a first side in the normal direction, and a high-frequency connection opening which is a connection side to the high-frequency terminal and is formed separately from the optical connection opening,
one of a pair of predetermined optical modules disposed adjacent to each other among the plurality of optical modules is a first optical module, and the other is a second optical module,
a first holding unit that holds the first optical module and a second holding unit that holds the second optical module are formed in the main housing,
the second holding unit holds the second optical module such that the module body of the second optical module is located on the first side of the module body of the first optical module, and
the second optical module is held by the second holding unit in a positional relation in which an outer peripheral edge of the module body of the second optical module enters a region located between an outer peripheral edge of the module body of the first optical module and an outer peripheral edge of the optical input and output unit of the first optical module in projection onto a virtual plane orthogonal to the normal direction.

2. The optical transceiver according to claim 1, wherein a plurality of optical transmission modules and a plurality of optical reception modules are assembled to the main housing as the optical modules.

3. The optical transceiver according to claim 2, wherein two or more optical transmission modules and same numbers of the optical reception modules are assembled to the main housing.

4. The optical transceiver according to claim 3, wherein the optical input and output unit of the second optical module is formed as a second module optical input and output unit which singly receives a section of a second total length from an optical coupling surface of the module body of the second optical module to the optical reference plane and in which an end portion on the second side is integrally joined to the metal cover,
the optical input and output unit of the first optical module is divided into a first module optical input and output unit and a short optical fiber ferrule,
the first module optical input and output unit is formed shorter than a section length of a first total length from an optical coupling surface of the module body of the first optical module to the optical reference plane, and an end portion on the second side is integrally joined to the metal cover, and
the short optical fiber ferrule has a length corresponding to a difference between the first total length and a total length of the first module optical input and output unit, an end surface on the first side is disposed to be aligned with the optical reference plane, and an end surface on the second side is optically coupled to the end surface on the first side of the first module optical input and output unit.

5. The optical transceiver according to claim 4, wherein at least two of the second module optical input and output unit, the first module optical input and output unit, and the short optical fiber ferrule are formed to have the same length.

6. The optical transceiver according to claim 2, wherein different numbers of the optical transmission modules and the optical reception modules are assembled to the main housing.

7. The optical transceiver according to claim 1, wherein in the projection, a distance between axes of the optical input and output unit of the first optical module and the optical input and output unit of the second optical module is smaller than a maximum diameter of the module bodies of the first optical module and the second optical module.

8. The optical transceiver according to claim 1, wherein the first holding unit and the second holding unit of the main housing hold the first optical module and the second optical module such that an end surface on the first side of an optical input and output unit of the first optical module and an end surface on the first side of an optical input and output unit of the second optical module are located on the same plane defined as an optical reference plane, and a total length of the optical input and output unit from the optical reference plane to an optical coupling surface of the light-passing unit in the second optical module is shorter than that in the first optical module.

9. The optical transceiver according to claim 8, wherein the optical input and output unit includes an optical fiber core wire that forms an optical transmission path and a ceramic ferrule that coaxially covers an outer side of the optical fiber core wire.

10. The optical transceiver according to claim 1, further comprising:
a high-frequency waveguide member including
a dielectric substrate,
a signal transmission line that is formed on the dielectric substrate and that is wider than the high-frequency terminal, and
a ground conductor that is formed on the dielectric substrate and that shields the signal transmission line, the signal transmission line being connected to the high-frequency terminal, wherein
when a distance in the normal direction between the second main surface of the metal substrate of the first optical module and the second main surface of the metal substrate of the second optical module is defined as an offset length, the high-frequency terminal is formed to be shorter than the offset length such that high-frequency terminal of the second optical module is in charge of only a partial section of the offset length, and
the high-frequency waveguide member is in charge of the remaining section of the offset length L.

11. The optical transceiver according to claim 10, wherein the top wall portion of the housing body is cut out at an end portion on the second side such that the module body of the first optical module is exposed.

12. The optical transceiver according to claim 11, wherein a partition wall portion that individually partitions the first optical module and the second optical module which are disposed in the width direction is provided in the housing body.

13. The optical transceiver according to claim 12, wherein the side wall portion and the partition wall portion have a cutout region located on the top wall portion side at the end portion on the second side in the normal direction.

14. The optical transceiver according to claim 1, wherein the main housing includes a cylindrical housing body in which the optical connection opening and the high-frequency connection opening are respectively formed, the housing body includes a top wall portion, a bottom wall portion, and a pair of side wall portions, when an opposing direction of the pair of side wall portions is a width direction of the housing body, the plurality of first optical modules are disposed in the width direction on a bottom wall portion side inside the housing body, and the second optical modules of the same number as the first optical module are disposed in the width direction on a top wall portion side.

15. The optical transceiver according to claim 1, wherein the main housing includes a cylindrical housing body in which the optical connection opening and the high-frequency connection opening are respectively formed, the first holding unit and the second holding unit each include a cantilever support unit and a module movement restricting unit, the cantilever support unit is formed in a cylindrical shape with both ends open and fixed to an inner surface of the housing body in a form in which a central axis is aligned with the normal direction, and the optical module is supported in a cantilever state in a state where the module body is projected from an end portion opening on the second side by inserting the optical input and output unit of the optical module from the end portion opening, the module movement restricting unit is formed in an opening peripheral edge portion of the high-frequency connection opening of the housing body, and movement of the optical module to the second side in the normal direction is restricted by bringing the module movement restricting unit into contact with a second main surface of a metal substrate of the optical module, the cantilever support units of the first holding unit and the second holding unit are formed in a positional relation in which end portion openings on the first side are aligned with each other in the normal direction, and the end portion opening on the second side of the cantilever support unit of the second holding unit and the module movement restricting unit are positioned to be spaced apart from the end portion opening on the second side of the cantilever support unit of the first holding unit and the module movement restricting unit on the first side.

16. The optical transceiver according to claim 15, wherein the module movement restricting unit includes
an elastic arm whose base end side is coupled to the high-frequency connection opening of the housing body and whose other end side extends toward the second side in the normal direction, and
a restricting claw protruding from a distal end of the elastic arm on the other end side toward an inside of the high-frequency connection opening.

* * * * *